(12) United States Patent
Penaflor

(10) Patent No.: US 9,648,949 B1
(45) Date of Patent: May 16, 2017

(54) VINYL WRAP HANGER AND STAND

(71) Applicant: Ronaldo Green Penaflor, Fallbrook, CA (US)

(72) Inventor: Ronaldo Green Penaflor, Fallbrook, CA (US)

( * ) Notice: Subject to any disclaimer, the term of this patent is extended or adjusted under 35 U.S.C. 154(b) by 0 days.

(21) Appl. No.: 15/043,964

(22) Filed: Feb. 15, 2016

(51) Int. Cl.
| | |
|---|---|
| *A47F 3/14* | (2006.01) |
| *A47B 81/00* | (2006.01) |
| *F16M 11/04* | (2006.01) |
| *F16M 11/26* | (2006.01) |
| *F16M 11/42* | (2006.01) |
| *B60J 11/06* | (2006.01) |
| *A47F 5/00* | (2006.01) |
| *A47F 7/00* | (2006.01) |
| *A47F 7/17* | (2006.01) |
| *A47B 45/00* | (2006.01) |

(52) U.S. Cl.
CPC .............. *A47B 81/00* (2013.01); *B60J 11/06* (2013.01); *F16M 11/041* (2013.01); *F16M 11/26* (2013.01); *F16M 11/42* (2013.01); *A47B 45/00* (2013.01); *A47B 81/007* (2013.01); *A47B 2200/0091* (2013.01); *A47F 5/0025* (2013.01); *A47F 7/0021* (2013.01); *A47F 7/17* (2013.01); *F16M 2200/027* (2013.01); *F16M 2200/028* (2013.01)

(58) Field of Classification Search
CPC ............ A47B 81/00; A47B 2200/0091; A47B 81/007; F16M 11/041; F16M 11/26; F16M 11/42; F16M 2200/027; F16M 2200/028; B60J 11/06; B62B 3/10; B62B 2202/02; B65H 16/00; B65H 16/02; B65H 16/04; A47F 3/08; A47F 7/17; A47F 5/0025; A47F 7/0021
USPC ....... 211/12, 6, 85.3, 16, 119.009, 124, 182, 211/204, 206, 45, 119.01, 133.1, 133.3, 211/24, 85.5, 85.18, 175, 151, 60.1, 211/85.22, 70.4; 156/71, 574; 280/79.11, 79.3; 493/471, 475; 193/42; 269/289 MR, 17; 242/594.1, 595
See application file for complete search history.

(56) References Cited

U.S. PATENT DOCUMENTS

| | | | | |
|---|---|---|---|---|
| 120,825 | A * | 11/1871 | Palmenberg | F16B 12/40 211/174 |
| 288,616 | A * | 11/1883 | Boynton | A47G 25/12 211/182 |
| 334,413 | A * | 1/1886 | Bachand | A47B 45/00 211/175 |
| 437,833 | A * | 10/1890 | Hoffman | B65G 1/026 211/151 |
| 490,288 | A * | 1/1893 | Hubbard | A47B 57/16 108/110 |
| 516,347 | A * | 3/1894 | Chamberlin | A47B 45/00 211/175 |

(Continued)

*Primary Examiner* — Joshua J Michener
*Assistant Examiner* — Devin Barnett

(57) ABSTRACT

A vinyl wrap hanger and stand for installing sheets of vinyl wrap to the surface of vehicles and motor crafts is presented. The vinyl wrap hanger and stand includes a base, a frame assembly, and a hanger assembly, having adjustable components to customize the installation of vinyl to different vehicle sizes. The vinyl wrap hanger and stand may be mounted to a platform having wheels, providing mobility. The platform may also include a vinyl roller assembly for supporting large rolls of vinyl.

17 Claims, 22 Drawing Sheets

(56) References Cited

U.S. PATENT DOCUMENTS

| | | | | | |
|---|---|---|---|---|---|
| 525,162 A * | 8/1894 | Schwartz | A47B 57/565 211/190 |
| 543,025 A * | 7/1895 | Knopf | A47F 7/24 211/204 |
| 580,655 A * | 4/1897 | Thew | A47F 5/0025 211/134 |
| 594,433 A * | 11/1897 | Sheldon | B62H 3/08 211/182 |
| 745,641 A * | 12/1903 | Messerly | D06F 57/08 211/182 |
| 770,589 A * | 9/1904 | Koll | A47F 7/163 211/182 |
| 795,152 A * | 7/1905 | Montgomery | A47F 7/30 211/182 |
| 892,218 A * | 6/1908 | Brumberg | A47B 37/00 108/31 |
| 905,163 A * | 12/1908 | Finney | A47F 7/30 211/134 |
| 909,336 A * | 1/1909 | Riedy | A47F 7/30 108/106 |
| 921,884 A * | 5/1909 | Petersen | B65G 1/026 211/151 |
| 972,447 A * | 10/1910 | Harper | A47F 7/30 211/208 |
| 1,008,477 A * | 11/1911 | Kohn | A47F 7/24 211/182 |
| 1,015,448 A * | 1/1912 | Madden | F16B 12/40 211/182 |
| 1,053,996 A * | 2/1913 | Isbell | A47B 57/265 108/107 |
| 1,092,909 A * | 4/1914 | Hardy | B65H 16/02 211/87.01 |
| 1,169,157 A * | 1/1916 | Honold | A47F 5/01 211/174 |
| 1,202,444 A * | 10/1916 | Soleau | B62H 3/00 211/182 |
| 1,238,571 A * | 8/1917 | Rosenthal | B65H 49/28 211/182 |
| 1,291,162 A * | 1/1919 | Roskoph | A47K 10/025 211/45 |
| 1,315,656 A * | 9/1919 | Burgener | A47L 4/04 15/268 |
| 1,322,901 A * | 11/1919 | Heinlein | A47B 61/06 190/16 |
| 1,367,817 A * | 2/1921 | Keller | A47K 10/025 211/45 |
| 1,374,986 A * | 4/1921 | Carter | B60B 29/002 211/175 |
| 1,464,904 A * | 8/1923 | Feldman | A47G 25/0664 182/181.1 |
| 1,515,824 A * | 11/1924 | Best | B62B 3/104 242/557 |
| 1,573,365 A * | 2/1926 | Wood | B62B 3/10 280/79.3 |
| 1,581,352 A * | 4/1926 | Kuen | A47F 5/02 211/131.1 |
| 1,587,090 A * | 6/1926 | Tweed | B65G 7/08 211/182 |
| 1,606,401 A * | 11/1926 | Craft | A47G 25/0664 160/327 |
| 1,769,326 A * | 7/1930 | Weis | A47K 10/04 211/123 |
| 1,843,834 A * | 2/1932 | Roberts | D05C 1/02 211/204 |
| 1,893,570 A * | 1/1933 | Waite | A47G 25/746 211/85.3 |
| 1,984,001 A * | 12/1934 | Tanzer | A47F 7/24 211/182 |
| 1,991,397 A * | 2/1935 | Lampman | A21B 3/00 211/182 |
| 1,994,981 A * | 3/1935 | Cook | A47F 7/163 211/45 |
| 2,002,566 A * | 5/1935 | Conigrave | A47K 10/12 211/6 |
| 2,017,248 A * | 10/1935 | Hondeville | A47K 10/42 211/124 |
| D99,074 S * | 3/1936 | Eastman | 211/182 |
| 2,059,445 A * | 11/1936 | Eastman | B25H 3/04 211/182 |
| 2,066,478 A * | 1/1937 | Lewin, Jr. | A47F 5/10 211/182 |
| 2,120,511 A * | 6/1938 | Risdon | A47F 7/24 211/123 |
| 2,246,081 A * | 6/1941 | Van Nattan | A47F 7/12 211/118 |
| 2,321,901 A * | 6/1943 | Eddy | F16M 11/42 248/161 |
| 2,495,109 A * | 1/1950 | Kramer | A47F 5/12 211/128.1 |
| 2,551,074 A * | 5/1951 | Walford | B60P 1/52 193/42 |
| 2,606,667 A * | 8/1952 | Hornick | A47K 10/10 188/69 |
| 2,634,033 A * | 4/1953 | Meyer | D06G 1/00 178/23 R |
| 2,760,647 A * | 8/1956 | Saul | A47B 57/30 211/182 |
| 2,793,764 A * | 5/1957 | Stork | A47F 7/24 16/43 |
| 2,834,558 A * | 5/1958 | Halpin | B65H 16/028 242/527.5 |
| 2,852,119 A * | 9/1958 | Jones | E01B 29/16 193/42 |
| 2,885,090 A * | 5/1959 | Forman | A47B 45/00 211/175 |
| 2,918,174 A * | 12/1959 | Tabbi | A47G 25/1464 211/49.1 |
| 2,931,514 A * | 4/1960 | Hughes | A47J 47/20 211/123 |
| 2,982,422 A * | 5/1961 | Asproyerakas | B62B 3/006 211/134 |
| 3,025,969 A * | 3/1962 | Daley | A47K 3/38 211/119.009 |
| 3,043,440 A * | 7/1962 | Berlin | A47G 25/0664 108/146 |
| 3,079,004 A * | 2/1963 | Scott | D06F 57/12 211/119.009 |
| 3,092,408 A * | 6/1963 | Berman | A47F 5/14 211/182 |
| 3,124,321 A * | 3/1964 | Rylott | B65H 54/585 242/397.5 |
| 3,144,946 A * | 8/1964 | Ellis | A47F 7/24 211/182 |
| 3,146,890 A * | 9/1964 | Cowper | D06F 57/12 211/119.009 |
| 3,272,464 A * | 9/1966 | Jacobson | A47F 5/04 211/124 |
| 3,338,422 A * | 8/1967 | Hickok | A63C 11/028 211/204 |
| 3,341,028 A * | 9/1967 | Nichols | A47F 5/13 211/182 |
| 3,371,797 A * | 3/1968 | Caligiuri | A47F 5/13 211/182 |
| 3,372,829 A * | 3/1968 | Averill | B65D 19/12 206/511 |
| 3,393,807 A * | 7/1968 | Sylvester | B29D 30/0016 211/168 |
| 3,395,811 A * | 8/1968 | Bellock | A47G 25/0664 211/168 |
| 3,429,449 A * | 2/1969 | Schroer | A47B 7/02 108/91 |
| 3,494,478 A * | 2/1970 | Link | A47B 47/027 211/182 |
| 3,499,541 A * | 3/1970 | Mackie | A47B 45/00 211/134 |
| 3,503,525 A * | 3/1970 | Loebner | A47F 5/13 182/153 |

(56) References Cited

U.S. PATENT DOCUMENTS

| | | | | |
|---|---|---|---|---|
| 3,523,694 A | * | 8/1970 | Oliver | A47B 87/0207 108/53.3 |
| 3,532,224 A | * | 10/1970 | Grubb | A47F 5/13 211/118 |
| 3,582,102 A | * | 6/1971 | Bewick | B62B 5/0093 108/53.3 |
| 3,606,025 A | * | 9/1971 | Wilson | A47F 5/135 206/509 |
| 3,689,098 A | * | 9/1972 | Rubin | B62B 3/005 280/33.998 |
| 3,722,702 A | * | 3/1973 | Marker, Jr. | A47F 5/13 108/115 |
| 3,831,959 A | * | 8/1974 | Fontana | B62B 5/0083 248/907 |
| 3,853,225 A | * | 12/1974 | Gegauff | A47G 25/746 211/124 |
| 3,875,711 A | * | 4/1975 | Palmer | E04B 2/7431 160/135 |
| 3,900,112 A | * | 8/1975 | Azzi | B65G 1/023 193/35 R |
| 3,912,187 A | * | 10/1975 | Woelky | B65H 16/005 242/370 |
| 3,921,814 A | * | 11/1975 | Solomon | A47F 7/24 211/124 |
| 3,946,878 A | * | 3/1976 | Stoveken | B42D 17/00 211/124 |
| 4,044,978 A | * | 8/1977 | Williams | B63H 20/36 248/640 |
| D249,615 S | * | 9/1978 | Frisbey | D6/675.2 |
| 4,191,339 A | * | 3/1980 | Durr | B65H 54/42 242/393 |
| 4,381,027 A | * | 4/1983 | Molen | B60C 25/147 157/1 |
| 4,394,910 A | * | 7/1983 | Miller | B65G 1/023 211/134 |
| 4,625,873 A | * | 12/1986 | Hayashi | A47G 25/06 211/100 |
| 4,684,091 A | * | 8/1987 | Moreschi | F16M 11/046 211/182 |
| 4,729,482 A | * | 3/1988 | Nicholson | A47K 10/04 211/105.2 |
| D295,931 S | * | 5/1988 | Bezzerides | D6/675.2 |
| 4,753,355 A | * | 6/1988 | Hall | A47G 25/145 211/105.1 |
| 4,821,985 A | * | 4/1989 | DeMatteis | A47F 13/085 211/12 |
| 4,844,393 A | * | 7/1989 | Lee | A47B 31/00 211/134 |
| 4,860,981 A | * | 8/1989 | Pierson | B65B 67/1227 248/97 |
| 4,934,015 A | * | 6/1990 | Mink | A47L 4/04 15/268 |
| 5,087,318 A | * | 2/1992 | Anderson | B65H 16/04 156/540 |
| 5,115,920 A | * | 5/1992 | Tipton | B65G 1/023 211/151 |
| 5,165,632 A | * | 11/1992 | Kuan | B25H 1/0007 248/129 |
| 5,190,305 A | * | 3/1993 | Putman | B62B 3/10 211/182 |
| 5,259,518 A | * | 11/1993 | Sorenson | B65G 1/023 211/151 |
| 5,318,174 A | * | 6/1994 | Zoroufy | A47F 5/0838 211/105.1 |
| 5,477,968 A | * | 12/1995 | Largent | A47B 81/00 211/204 |
| 5,509,671 A | * | 4/1996 | Campbell | B62B 1/264 242/557 |
| 5,520,293 A | * | 5/1996 | Hartley | A47B 81/068 211/182 |
| 5,617,962 A | * | 4/1997 | Chen | A47G 25/0664 211/204 |
| 5,644,994 A | * | 7/1997 | Liang | A47B 3/083 108/115 |
| 5,653,457 A | * | 8/1997 | Marmer | B62B 3/02 280/30 |
| 5,685,440 A | * | 11/1997 | Mason | D06F 59/02 211/189 |
| 5,718,344 A | * | 2/1998 | Joldeson | A47F 5/13 211/182 |
| 5,722,453 A | * | 3/1998 | Huxhold | A62C 33/04 137/355.16 |
| 5,788,092 A | * | 8/1998 | Teeney | B25H 3/04 211/182 |
| 5,806,865 A | * | 9/1998 | Chapman | F16M 11/42 248/129 |
| 5,816,417 A | * | 10/1998 | Reaves | D06F 57/06 160/127 |
| 5,944,896 A | * | 8/1999 | Landesman | B05B 13/0285 118/500 |
| 6,059,220 A | * | 5/2000 | Lassiter | B65H 49/24 242/129 |
| 6,116,437 A | * | 9/2000 | Rowe | F28D 1/04 211/119.008 |
| 6,168,031 B1 | * | 1/2001 | Schmidt | A47B 88/00 211/182 |
| 6,186,725 B1 | * | 2/2001 | Konstant | B65G 1/08 193/36 |
| 6,308,842 B1 | * | 10/2001 | Robbins, III | A47F 5/0006 206/494 |
| 6,321,920 B1 | * | 11/2001 | Pan | A47K 10/10 211/100 |
| 6,371,313 B1 | * | 4/2002 | Walter | A47F 5/10 211/105.1 |
| 6,382,643 B1 | * | 5/2002 | Baker | B62B 5/0083 16/110.1 |
| 6,390,311 B1 | * | 5/2002 | Belokin | A61M 5/1415 211/189 |
| 6,401,948 B1 | * | 6/2002 | Huang | A47F 5/137 211/206 |
| 6,516,694 B1 | * | 2/2003 | Easton | B23D 45/126 269/17 |
| 6,561,366 B2 | * | 5/2003 | Kim-So | A47F 5/10 211/189 |
| 6,626,307 B1 | * | 9/2003 | Lin | A47G 25/0664 211/206 |
| 6,656,301 B2 | * | 12/2003 | Kirby | B29D 30/0016 156/110.1 |
| 6,745,909 B1 | * | 6/2004 | Lai | A47G 25/0664 211/204 |
| 6,789,688 B2 | * | 9/2004 | Roush | A47F 5/01 211/201 |
| 6,860,493 B2 | * | 3/2005 | Orozco | B60B 33/0002 280/33.991 |
| 6,892,977 B2 | * | 5/2005 | Boone | B65H 16/106 242/554.5 |
| 6,935,523 B2 | * | 8/2005 | Ahn | A47F 5/137 211/189 |
| 6,978,904 B1 | * | 12/2005 | Lam | A47G 25/0671 211/1 |
| 7,000,877 B2 | * | 2/2006 | Wang | D06F 57/06 108/181 |
| 7,077,269 B2 | * | 7/2006 | Kissell | B65D 61/00 206/446 |
| 7,249,738 B2 | * | 7/2007 | Kaczorowski | B60B 33/0002 248/129 |
| 7,270,339 B2 | * | 9/2007 | Feick | A47F 5/137 211/186 |
| 7,345,587 B2 | * | 3/2008 | Bremer | G06K 7/10316 211/206 |
| 7,357,399 B1 | * | 4/2008 | Klotz | E21B 7/028 248/676 |
| 7,370,867 B2 | * | 5/2008 | Olson | A47J 39/006 280/47.131 |
| 7,383,612 B2 | * | 6/2008 | Bushey | B60B 33/0005 16/18 R |
| 7,513,511 B2 | * | 4/2009 | Chaseateau | B62B 1/002 280/43.1 |

(56) References Cited

U.S. PATENT DOCUMENTS

| | | | | |
|---|---|---|---|---|
| 7,530,580 B2* | 5/2009 | Holgesson | B62B 3/16 220/1.5 |
| 7,549,654 B2* | 6/2009 | Anderson et al. | B62B 3/006 211/85.24 |
| 7,578,400 B1* | 8/2009 | Hartman, Sr. | A47B 81/00 211/182 |
| 7,654,947 B1* | 2/2010 | Sjostedt | B65H 31/10 493/413 |
| 7,712,641 B2* | 5/2010 | Snyder | A47G 25/14 211/113 |
| 7,850,021 B2* | 12/2010 | Yang | A47B 47/0008 211/182 |
| 7,854,444 B2* | 12/2010 | Zhuang | B62B 3/02 280/651 |
| 7,896,324 B2* | 3/2011 | Okazaki | B62D 65/18 269/17 |
| 7,914,018 B1* | 3/2011 | Rezler | B62B 3/002 280/79.11 |
| 8,191,720 B2* | 6/2012 | Clark | A47F 5/103 211/189 |
| 8,196,873 B2* | 6/2012 | Kohn | A47F 9/042 248/100 |
| 8,342,493 B2* | 1/2013 | Flaig | B23K 37/0538 269/289 MR |
| 8,342,544 B1* | 1/2013 | Blewett | B62B 3/022 211/189 |
| 8,528,919 B2* | 9/2013 | Webster | B62B 3/008 280/651 |
| 8,579,126 B1* | 11/2013 | Cole | A47F 7/0071 211/175 |
| 8,641,061 B1* | 2/2014 | Sims | B62B 3/022 280/651 |
| 8,714,369 B2* | 5/2014 | Liu | A47F 7/30 211/13.1 |
| 8,720,913 B2* | 5/2014 | Fallon | B62B 3/02 280/47.35 |
| 8,870,196 B1* | 10/2014 | Christie | B62B 3/004 280/47.35 |
| D727,067 S* | 4/2015 | Cohen | D6/548 |
| 9,315,080 B1* | 4/2016 | Kliskey | B60B 29/002 |
| 9,415,886 B2* | 8/2016 | Sill | B65B 5/045 |
| 2001/0050517 A1* | 12/2001 | Spitzer | A47B 57/06 312/249.8 |
| 2002/0005389 A1* | 1/2002 | Guo | B65D 85/185 211/85.3 |
| 2002/0195411 A1* | 12/2002 | Liu | A45B 19/04 211/206 |
| 2003/0155730 A1* | 8/2003 | Chu | B62B 3/02 280/47.35 |
| 2003/0184035 A1* | 10/2003 | Yu | B62B 3/00 280/47.35 |
| 2003/0196975 A1* | 10/2003 | Murray | A21B 1/50 211/126.2 |
| 2004/0046083 A1* | 3/2004 | Mazzarolo | B65B 11/025 242/578 |
| 2004/0079717 A1* | 4/2004 | Klein | A47B 96/16 211/119.004 |
| 2004/0129661 A1* | 7/2004 | Segall | A47G 25/0664 211/206 |
| 2004/0232146 A1* | 11/2004 | Kessler | B65D 7/26 220/6 |
| 2005/0006861 A1* | 1/2005 | Dubois | B62B 3/04 280/33.998 |
| 2005/0029213 A1* | 2/2005 | Yong | D06F 57/06 211/206 |
| 2005/0127018 A1* | 6/2005 | Sung | A47F 5/137 211/206 |
| 2005/0151336 A1* | 7/2005 | Neuman | B62B 3/02 280/79.11 |
| 2005/0189454 A1* | 9/2005 | Smith | F16M 11/18 248/127 |
| 2005/0200090 A1* | 9/2005 | Ferraro | A47B 87/0284 280/47.35 |
| 2005/0275178 A1* | 12/2005 | Huesdash | A47B 57/482 280/47.35 |
| 2006/0022096 A1* | 2/2006 | Chan | A47B 23/046 248/129 |
| 2006/0065615 A1* | 3/2006 | Wang | A47B 91/02 211/206 |
| 2006/0103092 A1* | 5/2006 | Strahler | B62B 3/04 280/79.11 |
| 2006/0273548 A1* | 12/2006 | Bishman | B60P 3/1083 280/476.1 |
| 2007/0074434 A1* | 4/2007 | Johnson | A47B 23/02 40/611.1 |
| 2007/0125723 A1* | 6/2007 | Rockel | A47K 10/10 211/16 |
| 2007/0163974 A1* | 7/2007 | Lai | A47G 25/0664 211/85.3 |
| 2007/0235400 A1* | 10/2007 | Wald | A47F 7/00 211/85.7 |
| 2008/0029473 A1* | 2/2008 | Hu | A47G 25/0664 211/206 |
| 2008/0073866 A1* | 3/2008 | Santos Gomez | B64F 5/50 280/79.11 |
| 2009/0057501 A1* | 3/2009 | Huang | F16M 11/42 248/157 |
| 2009/0071919 A1* | 3/2009 | Blanchet | B65G 1/02 211/60.1 |
| 2009/0184073 A1* | 7/2009 | Lu | A47B 61/003 211/85.3 |
| 2009/0236299 A1* | 9/2009 | Hall | A47K 10/02 211/16 |
| 2010/0148019 A1* | 6/2010 | Simhaee | B65B 67/1227 248/97 |
| 2010/0181411 A1* | 7/2010 | Fernandez | A62C 33/02 242/403 |
| 2010/0213145 A1* | 8/2010 | Swank | A47K 10/04 211/16 |
| 2010/0300998 A1* | 12/2010 | Plante | D06F 53/04 211/85.3 |
| 2010/0303603 A1* | 12/2010 | Galante | A47B 97/00 414/811 |
| 2011/0036794 A1* | 2/2011 | Schott | A47G 25/0671 211/85.3 |
| 2011/0058701 A1* | 3/2011 | Fulks | F16M 11/10 381/362 |
| 2011/0114581 A1* | 5/2011 | Greenspon | A47F 7/24 211/85.3 |
| 2012/0007343 A1* | 1/2012 | Webster | B62B 3/008 280/659 |
| 2012/0012543 A1* | 1/2012 | Fan | H05K 7/1488 211/26 |
| 2012/0018966 A1* | 1/2012 | Moore | B62B 3/002 280/79.11 |
| 2012/0043732 A1* | 2/2012 | Itmec | B62B 5/0093 280/79.11 |
| 2012/0061504 A1* | 3/2012 | Powell | B65H 49/24 242/564 |
| 2012/0074082 A1* | 3/2012 | Hornsby | A47G 25/0685 211/85.3 |
| 2012/0097628 A1* | 4/2012 | Blacknell | A47B 45/00 211/85.3 |
| 2012/0134771 A1* | 5/2012 | Larson | B62B 3/02 414/800 |
| 2012/0193486 A1* | 8/2012 | Levin | F16M 11/10 248/124.1 |
| 2013/0037221 A1* | 2/2013 | Kliskey | B60B 30/02 157/1 |
| 2013/0075993 A1* | 3/2013 | Christie | B62B 3/16 280/79.3 |
| 2013/0200660 A1* | 8/2013 | Bahnof | A47B 21/00 297/135 |
| 2014/0092518 A1* | 4/2014 | Robinson | B65H 20/00 361/212 |
| 2014/0124464 A1* | 5/2014 | Nijakowski | F16L 3/223 211/60.1 |

(56) References Cited

U.S. PATENT DOCUMENTS

| | | | | |
|---|---|---|---|---|
| 2014/0138472 A1* | 5/2014 | Hanson | B65H 16/021 | 242/594.5 |
| 2015/0053633 A1* | 2/2015 | McDonnell | B65G 39/12 | 211/151 |
| 2015/0190000 A1* | 7/2015 | Leyden | A47F 5/0006 | 211/85.3 |
| 2015/0197369 A1* | 7/2015 | Amano | B65H 75/02 | 242/595 |
| 2015/0210496 A1* | 7/2015 | Harkless | B65H 16/04 | 242/597.4 |
| 2015/0230632 A1* | 8/2015 | Cantwell | A47F 7/30 | 119/28.5 |
| 2015/0232113 A1* | 8/2015 | Sabo | B25H 3/00 | 280/79.11 |
| 2015/0267857 A1* | 9/2015 | Smith | F16M 11/42 | 248/544 |
| 2015/0314026 A1* | 11/2015 | Mauzerall | A61L 2/26 | 312/209 |
| 2015/0374129 A1* | 12/2015 | Sozio | B65G 39/04 | 211/151 |
| 2016/0000225 A1* | 1/2016 | Kuo | A47B 96/021 | 211/119.009 |
| 2016/0037913 A1* | 2/2016 | Franck | A47B 57/20 | 211/208 |
| 2016/0081471 A1* | 3/2016 | Qian | B65D 90/006 | 414/800 |
| 2016/0081519 A1* | 3/2016 | Manko | A47K 10/04 | 211/16 |

* cited by examiner

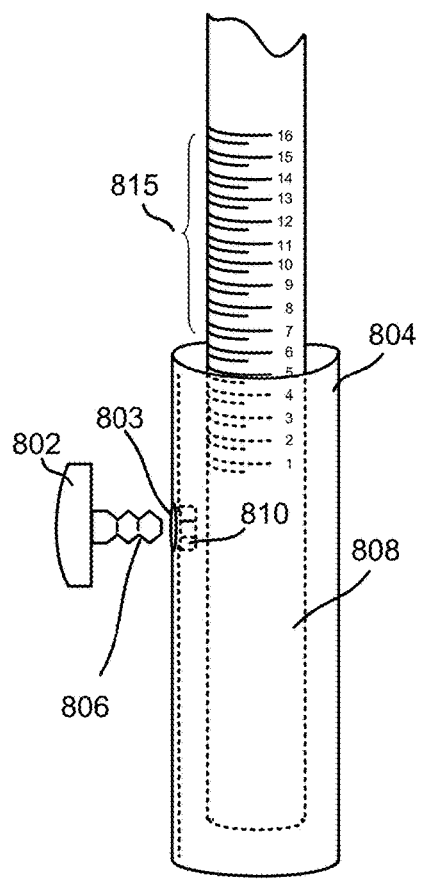
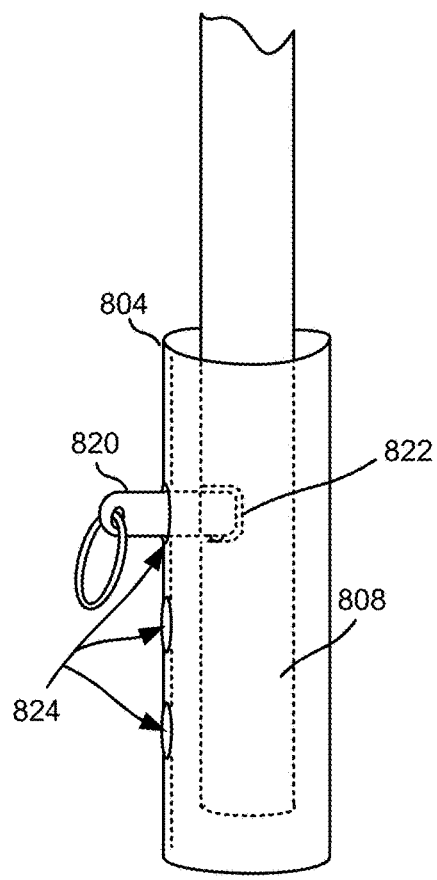
FIG. 8A     FIG. 8B

VINYL WRAP HANGER AND STAND

FIELD OF THE INVENTION

The present invention relates to a vinyl wrap hanger and stand used for installing vinyl sheets having an adhesive liner to motor vehicles and personal motor crafts.

BACKGROUND

Applying a sheet of vinyl wrap to cover the body of a vehicle can be a challenging task. The size of the vinyl wrap made for most vehicles often exceeds the arm length of an installer and typically requires two or more installers to properly handle and apply the vinyl wrap on the vehicle. Poor vinyl wrap installation due to improper installation may result in bubbling, creasing, misalignment, and tears in the vinyl.

Current products available on the market include vehicle wrap magnets. These magnets are designed to keep the vinyl wrap in place on the vehicle and prevent the vinyl from shifting during the installation process. These installation products may be adequate for some experienced installers but large size vinyl sheets may still be too difficult to handle by a single installer.

SUMMARY

It is an advantage of the present invention to provide a vinyl wrap hanger and stand apparatus for installing vinyl to the surface of a vehicle or motor craft by a single installer.

It is another advantage of the present invention to provide the vinyl wrap hanger and stand apparatus for commercial or home use.

In aspect of the present invention, the vinyl wrap hanger and stand apparatus is multi-functional, allowing the installer to use the stand for various vinyl installation tasks.

In another aspect, the vinyl wrap hanger and stand apparatus includes a support base; a frame assembly coupled to the support base; and an adjustable hanger assembly coupled to the frame assembly, wherein the adjustable hanger assembly includes a pair of adjustable hanger members, a pair of hanger arms wherein each hanger arm is coupled to each adjustable hanger member, and a hanger bar coupling the pair of hanger arms, wherein the hanger bar is adapted to hang the vinyl sheet.

In yet another aspect, the vinyl wrap hanger and stand apparatus includes a pair of height extension members coupling the frame assembly to adjustable hanger assembly.

In still yet another aspect, each height extension member includes a cavity through which each adjustable hanger member is inserted.

In another aspect, each adjustable hanger member is fastened to the height extension member by a fastening mechanism thereby setting the height of the adjustable hanger assembly.

In another aspect, fastening mechanism includes knurled knobs, knurled clamping knobs, screw clamps, or L-Shaped screws.

In another embodiment, the vinyl wrap hanger and stand of includes a platform having a top surface and bottom surface, wherein the top surface is connected to the support base.

In yet another embodiment, the vinyl wrap hanger and stand includes a vinyl roller assembly coupled to the top surface of the platform, the vinyl roller assembly having a pair of vinyl rollers adapted to support a vinyl roll having a width of about 5 feet.

In still yet another embodiment, the vinyl wrap hanger and has a power strip coupled to the top surface of the platform.

In some embodiments, the vinyl wrap hanger and stand of includes four wheels coupled to the bottom surface of the platform.

In another embodiment, the hanger bar is linear in shape or has a curve shape.

In yet another embodiment, the vinyl wrap hanger and stand has a pair of vertical posts, a pair of horizontal members coupled to the vertical posts by a first set of coupling members and a second set of coupling members, and a pair of vertical base members coupled to the vertical posts through the second set of coupling members.

In still yet another embodiment, the vinyl wrap hanger and stand include a pair of guide and holder mounts, each guide and holder mount coupled to each vertical post of the frame assembly.

In some aspects, the vinyl wrap hanger and stand has an adjustable vertical height ranging between 40 to 60 inches.

In some other aspects, the vinyl wrap hanger and stand has an adjustable vertical height ranging between 60 to 80 inches.

In yet another aspect, the vinyl wrap hanger and stand has a pre-determine width of at least 60 inches wide.

In still yet another aspect, each hanger arm has a length of at least 18 inches.

In another embodiment, a top end of a sheet of vinyl wrap is temporarily mounted to the hanger bar by tape, adhesive strips, c-clips, c-clamps, or push-pins.

These and other objects, features and advantages of the present invention will become more apparent in light of the following detailed description of preferred embodiments thereof, as illustrated in the accompanying drawings.

BRIEF DESCRIPTION OF THE DRAWINGS

The present invention will be more clearly understood from the following detailed description of the preferred embodiments of the invention and from the attached drawings, in which:

FIG. 8A illustrates a side view of a first type locking mechanism, in accordance with an embodiment.

FIG. 8B illustrates a side view of a second type locking mechanism, in accordance with an embodiment.

In the appended figures, one or more elements may have the same reference numeral in different figures indicating previously described elements.

DETAILED DESCRIPTION

As an alternative to paint, vinyl wraps offer vehicle owners a way to alter the color of the vehicle, creating a totally new and refreshed look. Vinyl wraps include decorative colors, textures (carbon fiber, brushed metal, snake, mosaic, etc.), protective clear films, and photorealistic images that are generally not achievable by spray painting methods alone. Vinyl wraps are made from vinyl sheets or decals with an adhesive side covered by a removable an adhesive liner (non-stick backing layer). During installation, the adhesive liner is removed, exposing the adhesive side which the installer applies to the vehicle. Improvements in plastics have led to advanced types of vinyl having bubble-preventing air channels, reducing or eliminating bubbles and wrinkles from forming during installation. Sheets of vinyl wrap may be heated with a heat gun to conform the material around curved bodies. In practice, it is common to heat the vinyl wrap during installation to relax the vinyl wrap, making it more pliable and easier for the installer to stretch and apply the wrap to the surface of the vehicle without damaging the material or distorting the images or textures printed or formed on the sheet of vinyl. Vinyl wraps may have many advantages over paint including lower cost per unit surface area, the use of non-toxic chemicals, being easily removable without damaging the underlying surface, being conformable to curved bodies, providing a protective rust barrier over the underlying surface, and being highly durable against rain and ultra-violet (UV) exposure. For the automotive industry, large sheets of vinyl wraps are generally available in 5 feet×(50, 100, 150, 200) feet rolls, for example, to accommodate full coverage of the doors, side panels, bumpers, hood and roof of most vehicles. Handling large sheets of vinyl during the installation process generally requires two or more installers once the adhesive liner is removed from the vinyl, avoiding the possibility of the adhesive side from overlapping and ruining the vinyl sheet. Even with multiple installers, poor positioning and lack of control of the vinyl may still result in a defective installation. Described herein below is a vinyl wrap hanger and stand apparatus designed to assist a single installer with the installation process of large sheets of vinyl wrap to the surface of the vehicle. Moreover, the vinyl wrap hanger and stand apparatus may benefit both commercial and do-it-yourself (DIY) vinyl installers, saving both time and money.

Figure 1:
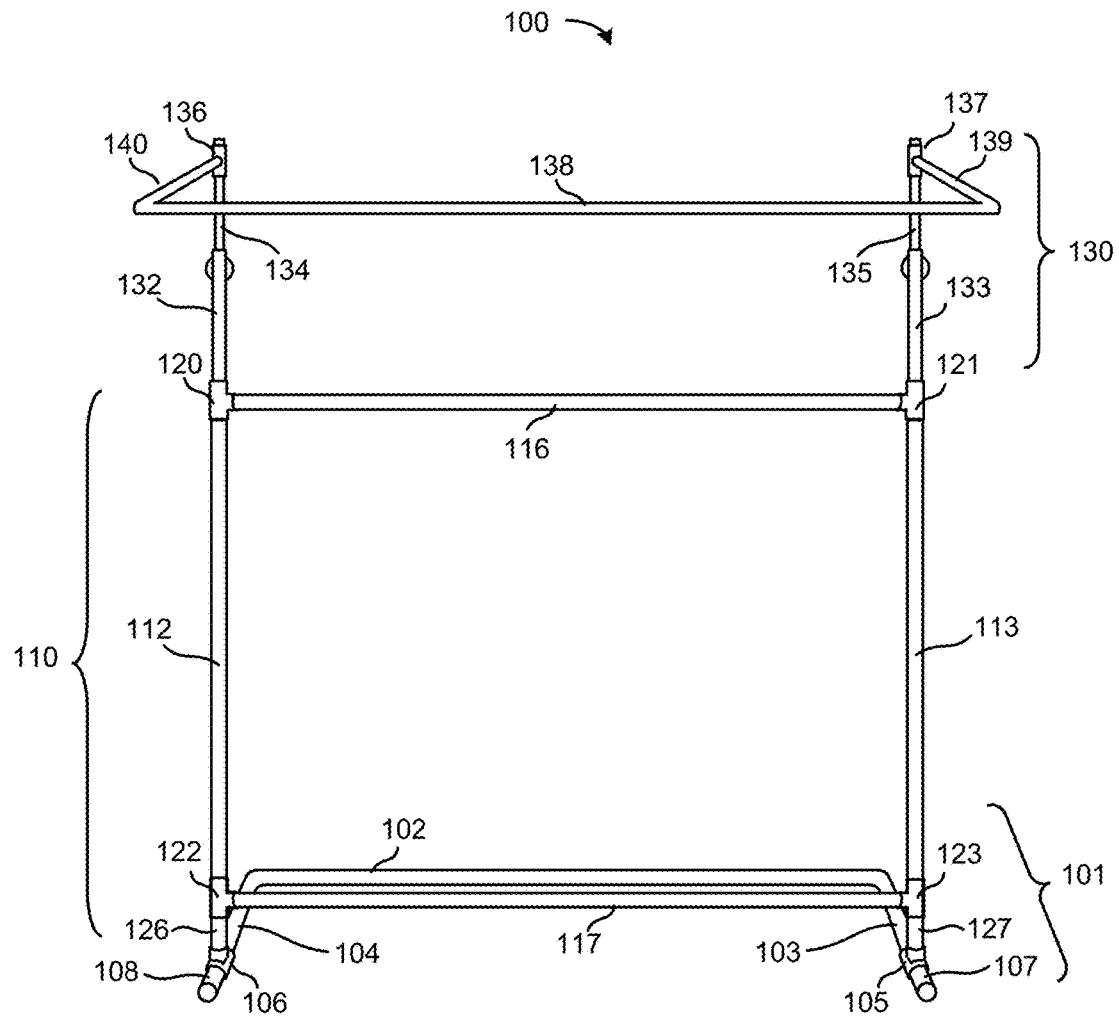
FIG. 1 illustrates a front view of a vinyl wrap hanger and stand, in accordance with an embodiment.

FIG. 1 illustrates a front view of a vinyl wrap hanger and stand 100. Starting from the bottom of FIG. 1, the vinyl wrap hanger and stand 100 includes a support base 101 comprising a u-shaped base member 102 having two base member ends (103, 104), a pair of joint couplers such as three-way couplers (105, 106), and a pair of protruding members (or feet) (107, 108). Each base member end (103, 104) of the u-shaped base member 102 is attached to a first coupling end of each three-way coupler (105, 106), respectively. Each three-way coupler (105, 106) may also be attached to the protruding member (107, 108), respectively, at a second coupling end of each of the three-way coupler (105, 106). In practice, the support base 101 provides stabilization and prevents the vinyl wrap hanger and stand 100 from swaying or tilting.

Referring to the middle of FIG. 1, the vinyl wrap hanger and stand 100 includes a frame assembly 110 having a pair of vertical posts (112, 113), a pair of horizontal members (116, 117), joint couples such as four three-way couplers (120, 121, 122, 123), and a pair of vertical base connectors (126, 127). To provide lateral support of the frame assembly 110, a top horizontal member 116 may be connected at the top of the frame assembly 110 via the top three-way couplers (120, 121) and a bottom horizontal member 117 may be connected near the bottom of the frame assembly 110 via the bottom three-way couplers (122, 123). Each vertical post (112, 113) is coupled to the pair of vertical base connectors (126, 127) via the three-way couplers (122, 123), respectively. The frame assembly 110 is coupled to the support base 101 by the pair of vertical base connectors (126, 127) and at a third coupling end of each of the three-way couplers (105, 106). Each vertical post (112, 113) and each horizontal member (116, 117) may include cylinders, pipes, square-tubes, bars, or the like.

Referring to the top-section of FIG. 1, the vinyl wrap hanger and stand 100 includes an adjustable hanger assembly 130, The adjustable hanger assembly 130 further including a pair of height extension members (132, 133) having a hollow interior, a pair of adjustable hanger members (134, 135), a joint connectors such as a pair of 90 degree couplers (136, 137), and a u-shaped hanger bar 138 having a pair of hanger arms (139, 140). Each hanger arm (139, 140) of the hanger bar 138 may be attached to a first coupling end of each 90 degree coupler (136, 137), respectively. In addition, each 90 degree coupler (136, 137) may be attached to the adjustable hanger members (134, 135), respectively, at a second coupling end of each of the 90 degree coupler (136, 137). As assembled, each adjustable hanger members (134, 135) is inserted into the cavity formed within each of the height extension members (132, 133), respectively. The height of the adjustable hanger assembly 130 may be adjusted to various height positions by fastening the adjustable hanger members (134, 135) into the height extension member (132, 133) using various locking mechanisms described later herein below. In an alternative embodiment, the height extension members (132, 133) may be removed and each adjustable hanger member (134, 135) may be inserted directly into a cavity formed in each vertical post (112, 113) of the frame assembly 110 via the via three-way couplers (120, 121), respectively.

Figure 2:
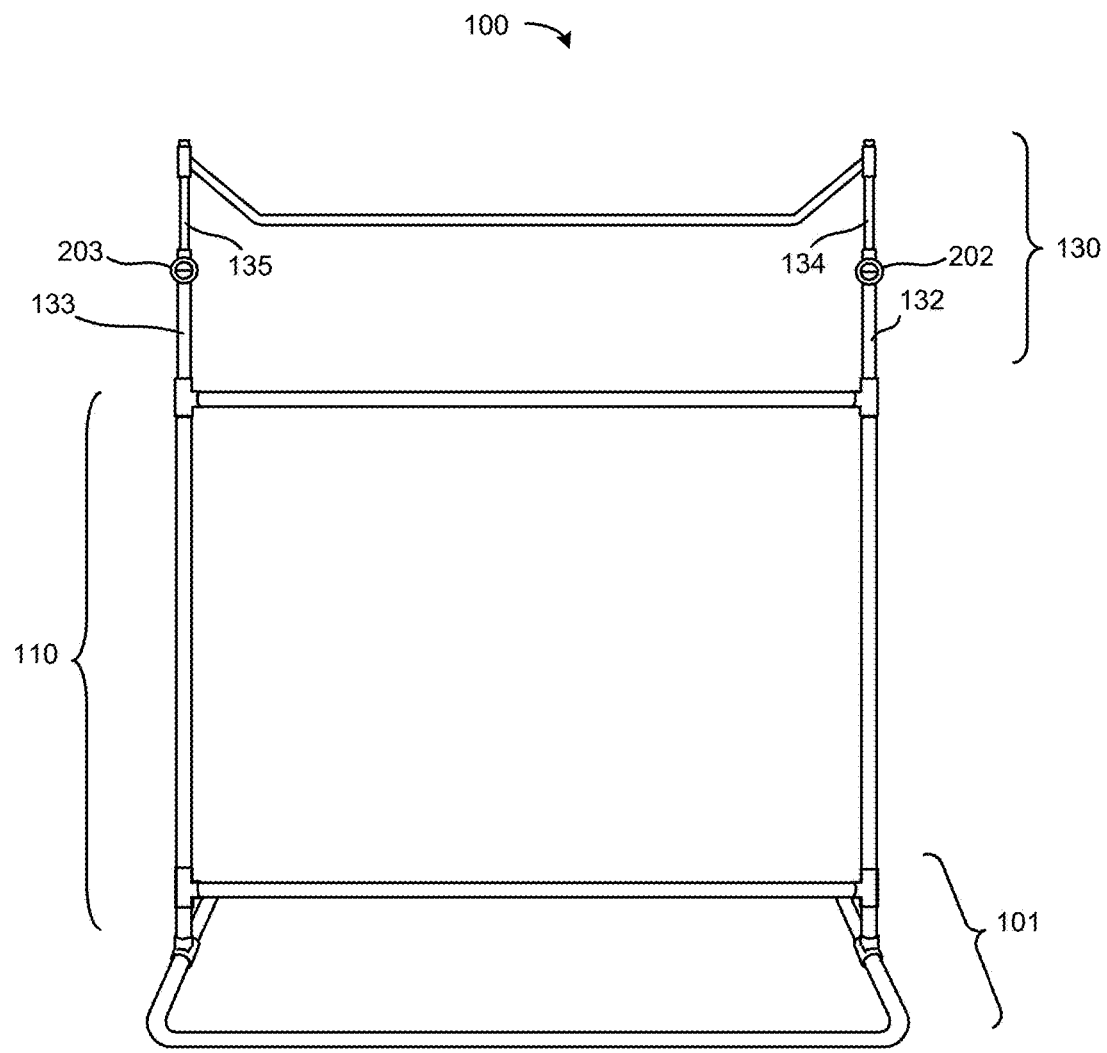
FIG. 2 illustrates a back view of the vinyl wrap hanger and stand, in accordance with an embodiment.

FIG. 2 illustrates a view of the back the vinyl wrap hanger and stand 100. Assemblies shown in FIG. 2 include the support base 101, the frame assembly 110, and the hanger assembly 130. More evident in this illustration is a pair of hanger locking mechanisms (202, 203), each of which is attached to the height extension members (132, 133), respectively. The hanger locking mechanisms (202, 203) include, for example, knurled knobs, knurled clamping knobs, screw clamps, and L Shaped knob screws. Each hanger locking mechanism (202, 203) may include a handle and a threaded screw which fits inside a threaded hole formed on the exterior of each height extension members (132, 133). Adjusting the height of the hanger assembly 130 is accomplished by 1) loosening the hanger locking mechanisms (202, 203), 2) lifting or lowering the hanger assembly 130 to the desired height, and then 3) tightening hanger locking mechanisms (202, 203) so that is presses against the adjustable hanger members (134, 135) to lock it in place. Additional details, variations, and practical applications and uses of this locking mechanism feature are described later in this document.

Figure 3:
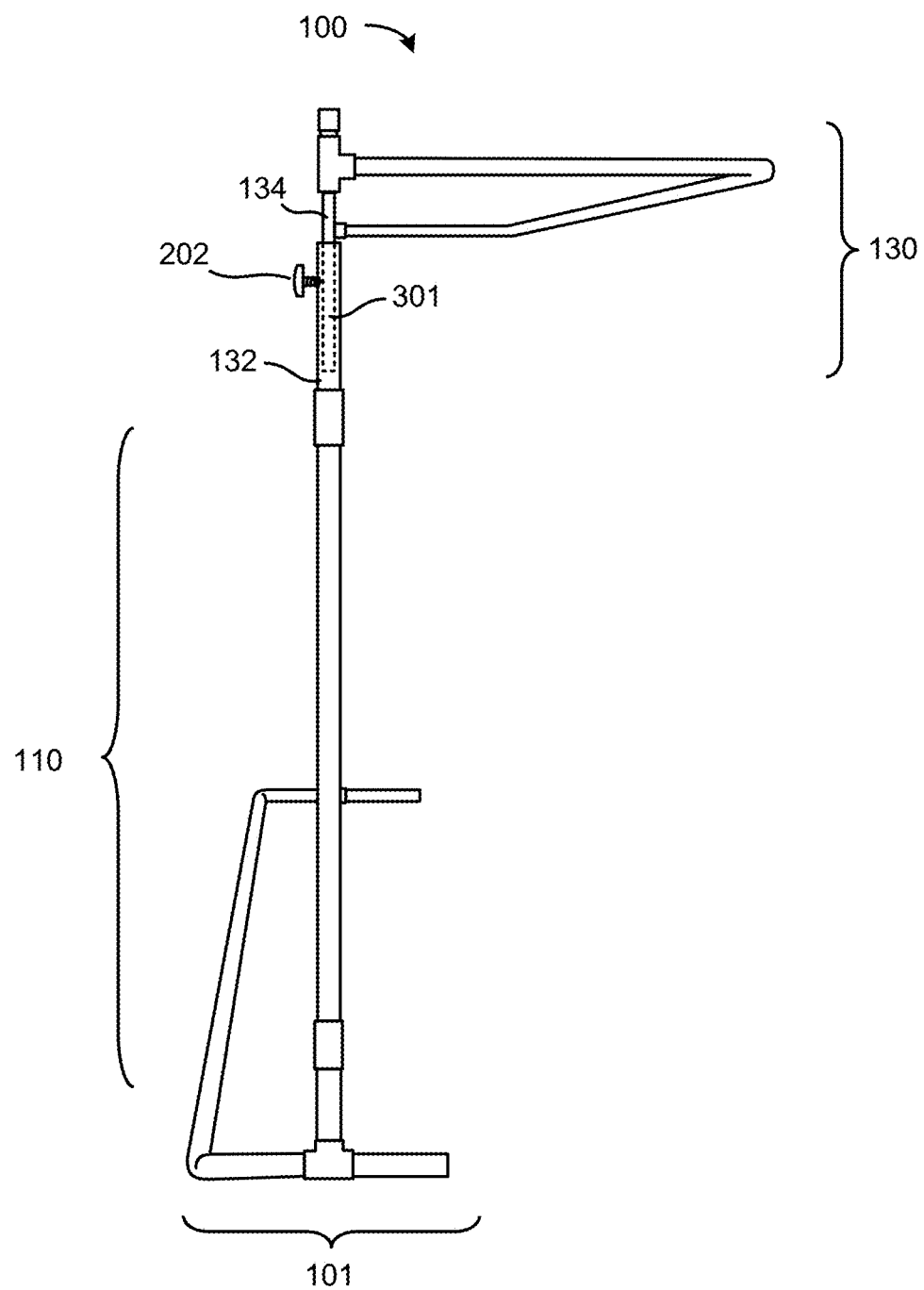
FIG. 3 illustrates a side view of the vinyl wrap hanger and stand, in accordance with an embodiment.

FIG. 3 illustrates a side view of the vinyl wrap hanger 100 and stand. In this embodiment, assemblies shown in side view include the support base 101, the frame assembly 110, and the hanger assembly 130. The left adjustable hanger member 134 is further illustrated in FIG. 3 having an inner portion 301 (dotted lines) inserted into the cavity formed within the height extension member 132. The inner portion 301 of the adjustable hanger member 134 is adapted to slide freely when inserted into the height extension member 132 thereby allowing various height adjustments to the hanger assembly 130. By tightening the hanger locking mechanisms (202, 203) into the height extension members (132, 133), the threaded screws of the hanger locking mechanisms (202, 203) engages with the inner member portion 301 of the adjustable hanger member 134 thereby preventing it from sliding and locking it in place. Although not visible in FIG. 3, the above example may also apply to the right adjustable hanger member 135, wherein like features and elements are connected to like elements and perform in the same manner.

Figure 4:
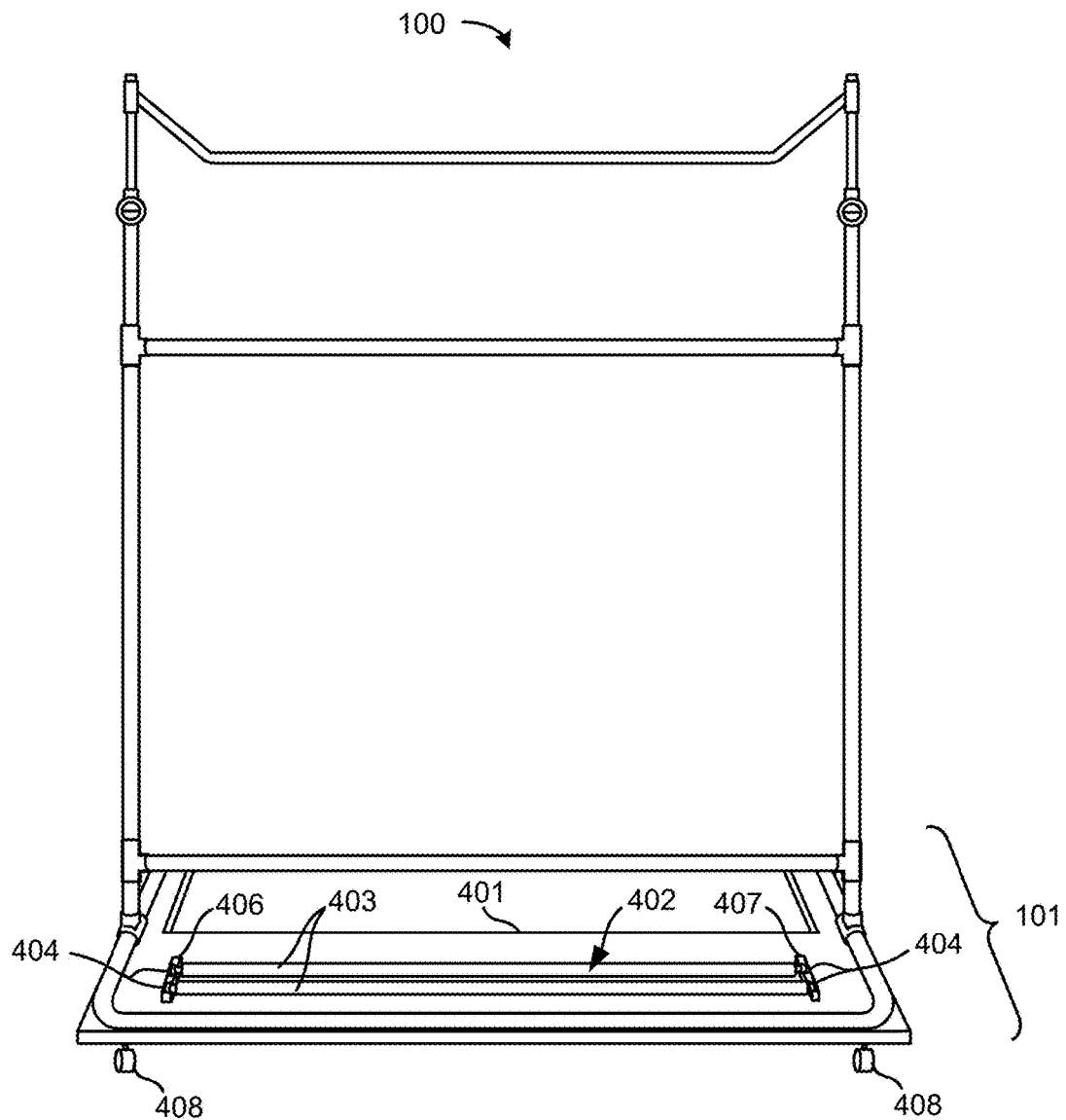
FIG. 4 illustrates a back view of the vinyl wrap hanger and stand mounted to a platform with a vinyl roller assembly, in accordance with an embodiment.

In accordance with another embodiment, FIG. 4 illustrates the vinyl wrap hanger and stand 101 mounted to a platform 401 with a vinyl roller assembly 402. The platform 401 may provide added stability to the support base 101 by securing and mounting the bottom of the support base 101 directly to the platform 401 using screws, adhesive materials or other fasteners. The vinyl roller assembly 402 may include a pair of conveyor rollers 403 and bearings 404 at each end of the conveyor rollers 403. Bearing support rails (406, 407) are provided at each end of the vinyl roller assembly 402 to carry and distribute the weight of the load placed on the conveyor rollers 403. Furthermore, the bearing support rails (406, 407) may be mounted on the platform 401 using screws, adhesive materials or other fasteners. Four wheels 408 may be mounted to bottom side of the platform 401, providing added mobility of the vinyl wrap hanger and stand 101.

Figure 5:
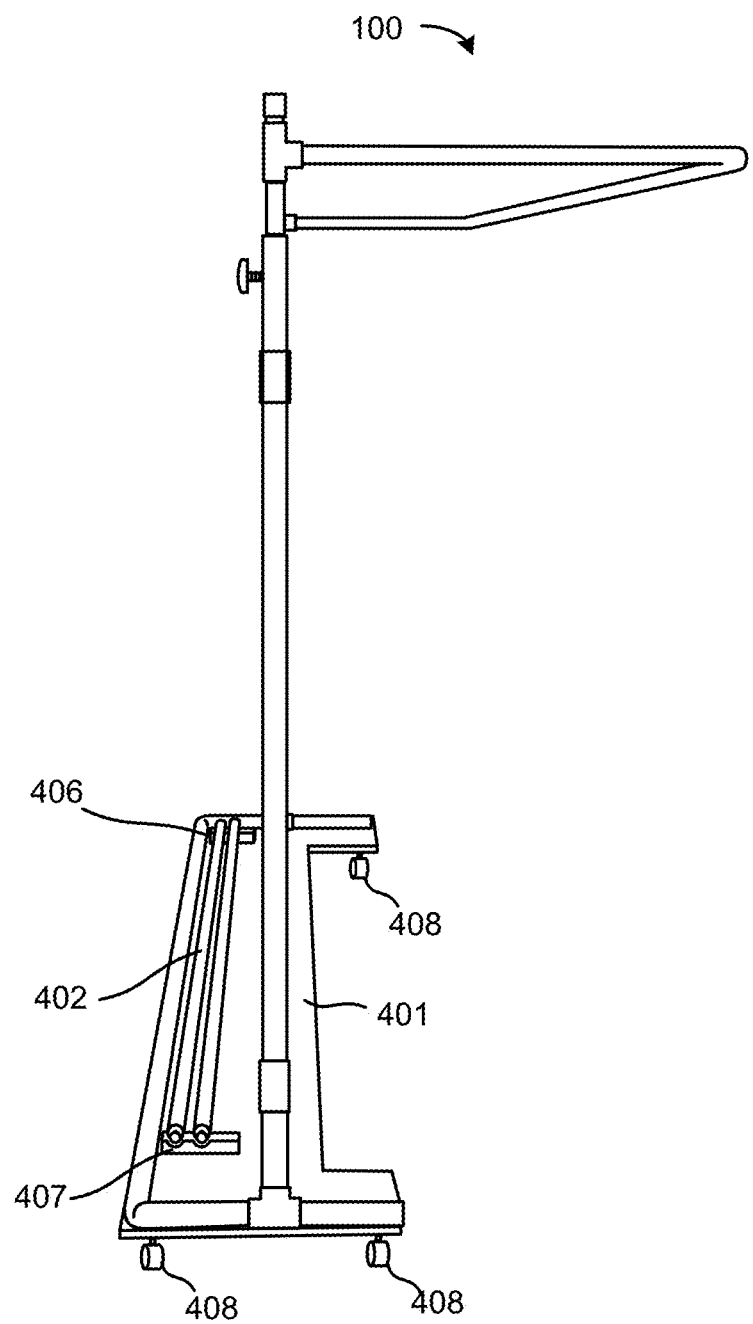
FIG. 5 illustrates a side view of the vinyl wrap hanger and stand mounted to the platform with the vinyl roller assembly, in accordance with an embodiment.

FIG. 5 illustrates a side view of the vinyl wrap hanger and stand 100 mounted to the platform 401 with the vinyl roller assembly 402, in accordance with an embodiment. In this example, a side profile of the bearing support rails (406, 407) are made visible along with additional wheels 408 located on the front side of the vinyl wrap hanger and stand 100. Further details of the bearing support rails (406, 407) are provided later herein below.

Figure 6A:
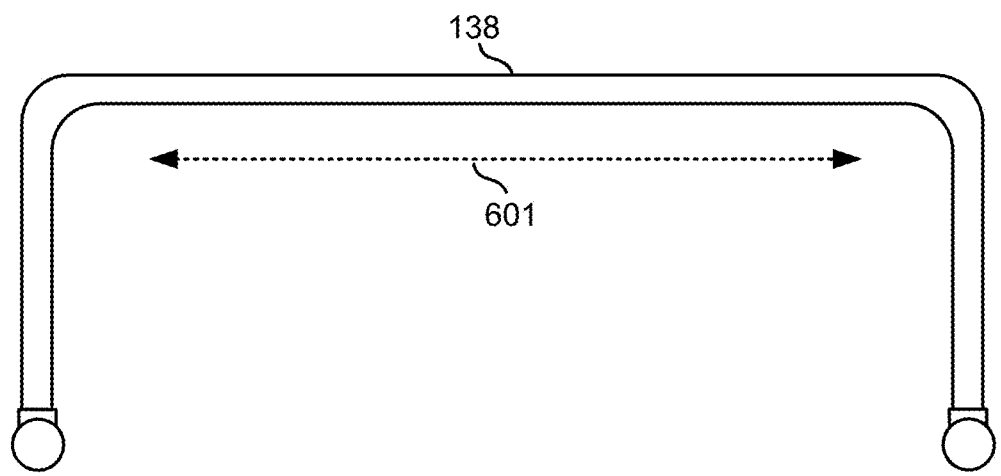
FIG. 6A illustrates a top view of a straight u-shaped hanger bar, in accordance with an embodiment.
Figure 6B:
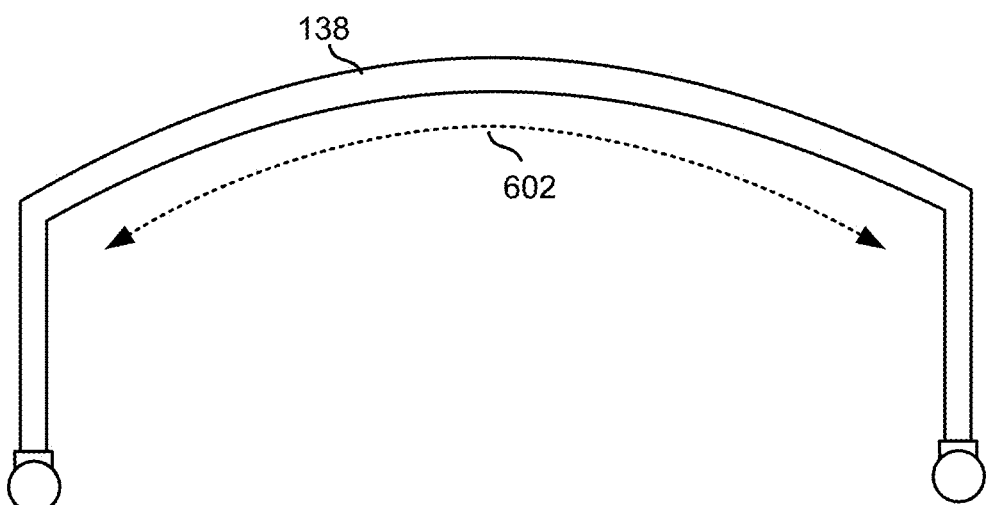
FIG. 6B illustrates a top view of a curved u-shaped hanger bar, in accordance with an embodiment.

FIG. 6A illustrates a top view of the u-shaped hanger bar 138 having a linear design 601 along the lengthwise or horizontal axis of the u-shaped hanger bar 138. In yet another embodiment, the u-shaped hanger bar 138 may include non-linear shapes such as a curved design 602 as shown in FIG. 6B, as seen from the top thereof.

Figure 7:
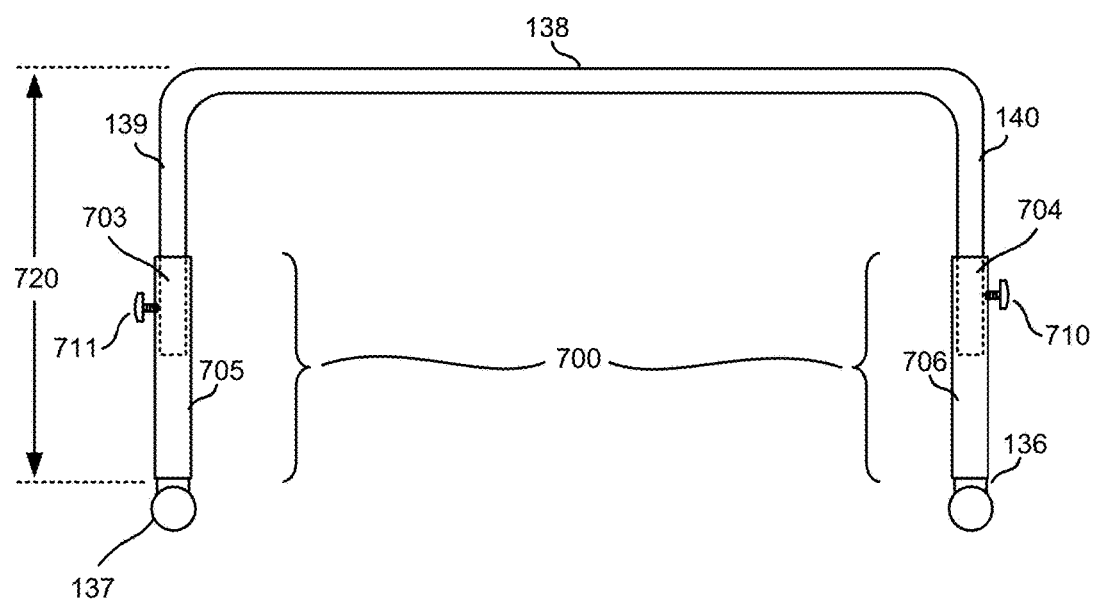
FIG. 7 illustrates a top view of the straight hanger bar with adjustable extension rods, in accordance with an embodiment.

In FIG. 7, the u-shaped hanger bar 138 of the vinyl wrap hanger and stand 100 may include adjustable arms 700, in accordance with yet another embodiment. The adjustable arms 700 may include, for example, a pair of arm extension members (705, 706), each arm extension members having a hollow interior, and a pair of arm locking mechanisms (710, 711). In this embodiment, each inner member portion (703, 704) of each hanger arm (139, 140) of the hanger bar 138 is inserted into a cavity of a first end of each arm extension member (705, 706), respectively. A second end of each arm extension member (705, 706) is attached to the first coupling end of each 90 degree coupler (136, 137), respectively. The hanger bar 138 may freely slide in or out of the arm extension member (705, 706) and locked into place using arm locking mechanisms (710, 711), respectively. The combined length of each hanger arm (139, 140) coupled to each extension member (705, 706) when fully retracted or fully extended defines an adjustable hanger arm length 720. Arm locking mechanisms may include, for example, knurled knobs, knurled clamping knobs, screw clamps, and L Shaped knob screws.

FIG. 8A illustrates a side view of a first type locking mechanism 802, in accordance with an embodiment. This type of locking mechanism includes, for example, knurled knobs, knurled clamping knobs, screw clamps, and L Shaped knob screws, and are used to fasten and hold in place the extension members (e.g., 132, 133, 705, or 706 described hereinabove). In FIG. 8A, a threaded hole 803 formed along the body of the extension member 804 (e.g., 132, 133, 705, or 706 described hereinabove) is adapted to receive a threaded screw 806 of locking mechanism 802. When fully inserted, the threaded screw 806 makes contact with an insertion member 808 (e.g., 301, 703, 704 described hereinabove), preventing it from sliding in or out of the extension member 804. An optional locking bolt 810 may be attached to the inside of the extension member 804 to receive the threaded screw 806. The insertion member 808 (e.g., 301, 703, 704 described hereinabove), may include optional linear marks or hash marks marked off in a linear scale, such as in inches or centimeters, for setting the vertical height position of the adjustable hanger assembly 130 or the width of the adjustable hanger arm length 720 to a specific length or width.

FIG. 8B illustrates a side view of a second type locking mechanism, in accordance with another embodiment. This type of locking mechanism includes, for example, a locking pin 820 to lock the inner member 808 in place. A keyhole 822 formed in the inner member 808 is designed to mate and lock with the locking pin 820 when aligned. In addition, multiple holes 824 may be formed on the extension member 804, allowing for multiple height or length adjustments.

Figure 9:
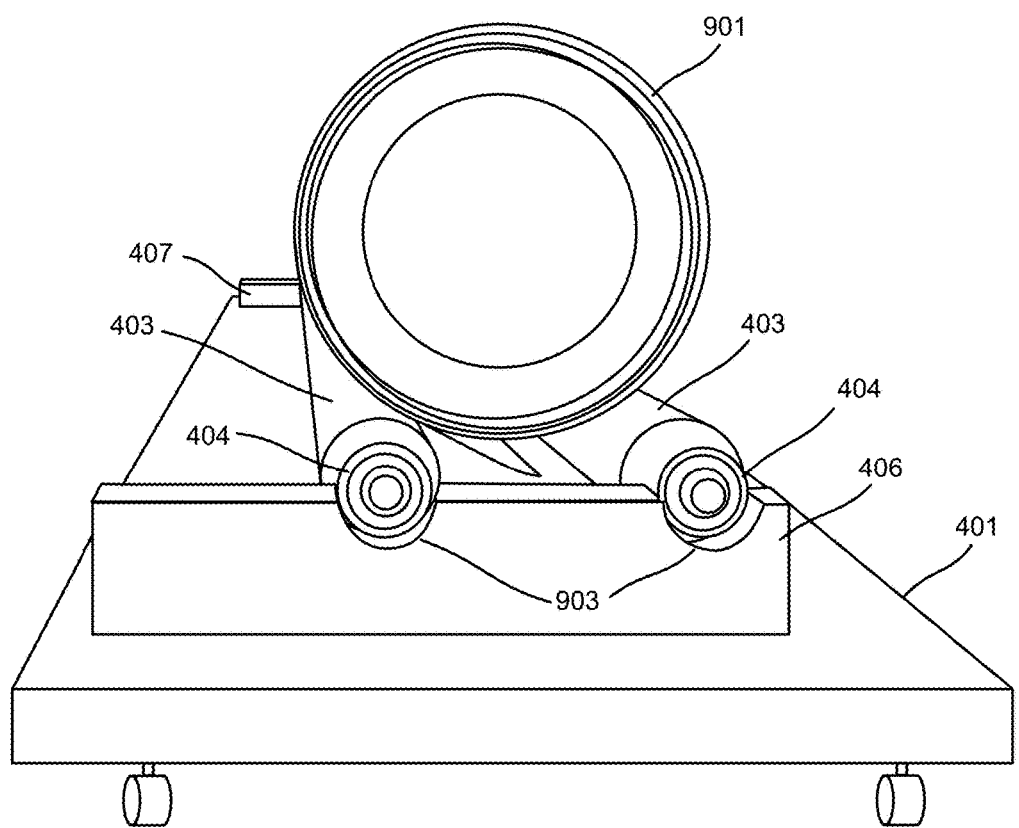
FIG. 9 illustrates a close-up profile view of the vinyl roller assembly of the vinyl wrap hanger and stand with a vinyl roll, in accordance with an embodiment.

FIG. 9 illustrates a close-up profile view of the vinyl roller assembly 402 having a vinyl roll 901 positioned on the vinyl rollers 403 of the vinyl wrap hanger and stand 100. Bearings 404 and bearing support rails (406, 407) located at each end of the vinyl roller assembly 402 carry and distribute the weight of the vinyl roll 901 placed on the conveyor rollers 403. Each bearing support rails (406, 407) may include multiple bearing carrier guides 903 for receiving supporting each bearing 404.

Figure 10:
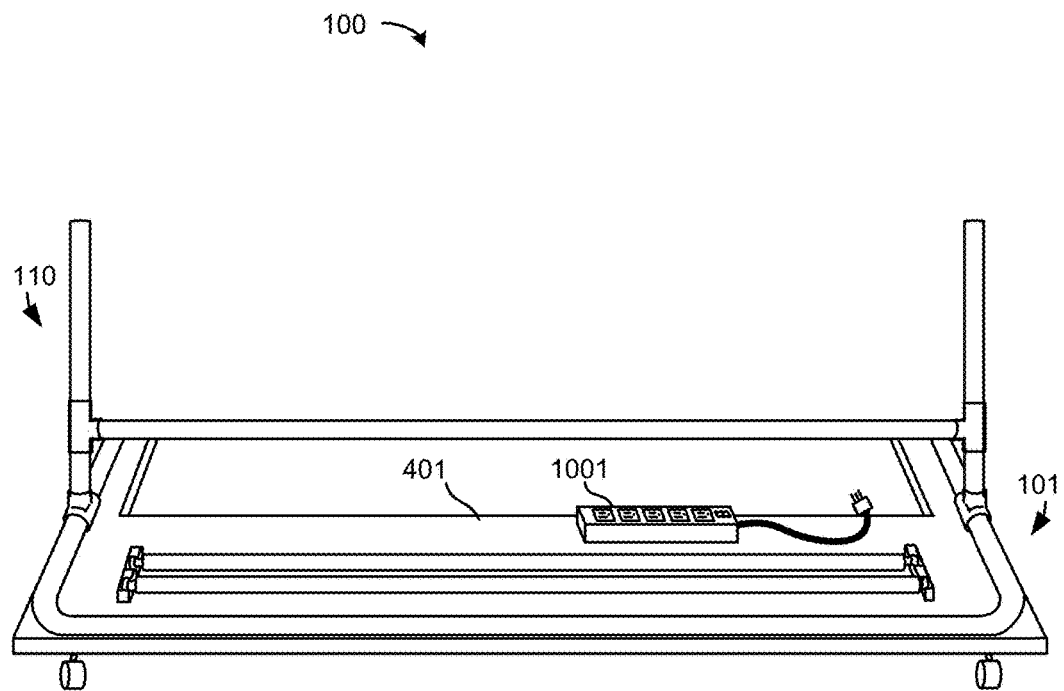
FIG. 10 illustrates a bottom portion view of the back of the vinyl wrap hanger and stand having a power strip mounted to the base of the platform, in accordance with an embodiment.

FIG. 10 illustrates a bottom portion of the frame assembly 110 and support base 101 of the vinyl wrap hanger and stand 100 having a power strip 1001 mounted to the base of the platform 401, in accordance with yet another embodiment. The power strip 1001 may provide added convenience for the installer, supplying a local power source on the vinyl wrap hanger and stand 100 to power lighting, heat guns, and other electrical equipment.

Figure 11:
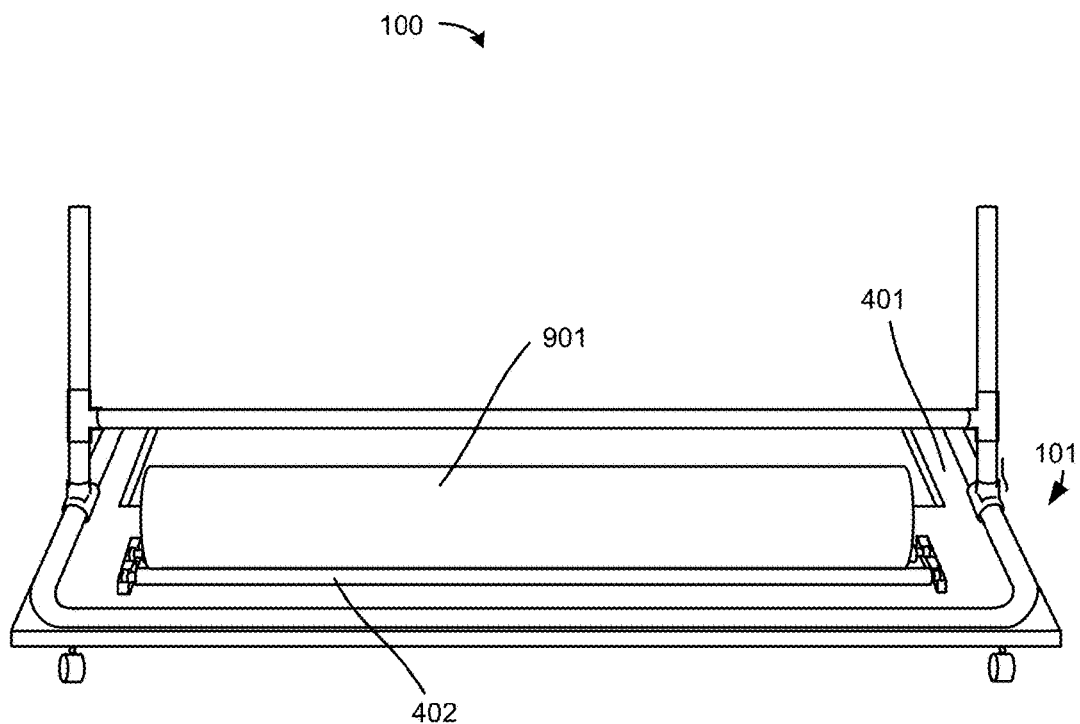
FIG. 11 illustrates a bottom portion view of the platform having a vinyl roll placed on the vinyl roller assembly, in accordance with an embodiment.

FIG. 11 illustrates a bottom portion of the back view of the vinyl wrap hanger and stand 100 having the vinyl roll 901 placed on the vinyl roller assembly 402. As used in practice, this illustration is intended to demonstrate the placement and relative dimensions of the vinyl roll 901 with respect to the platform 401 and vinyl wrap hanger and stand 100.

Figure 12:
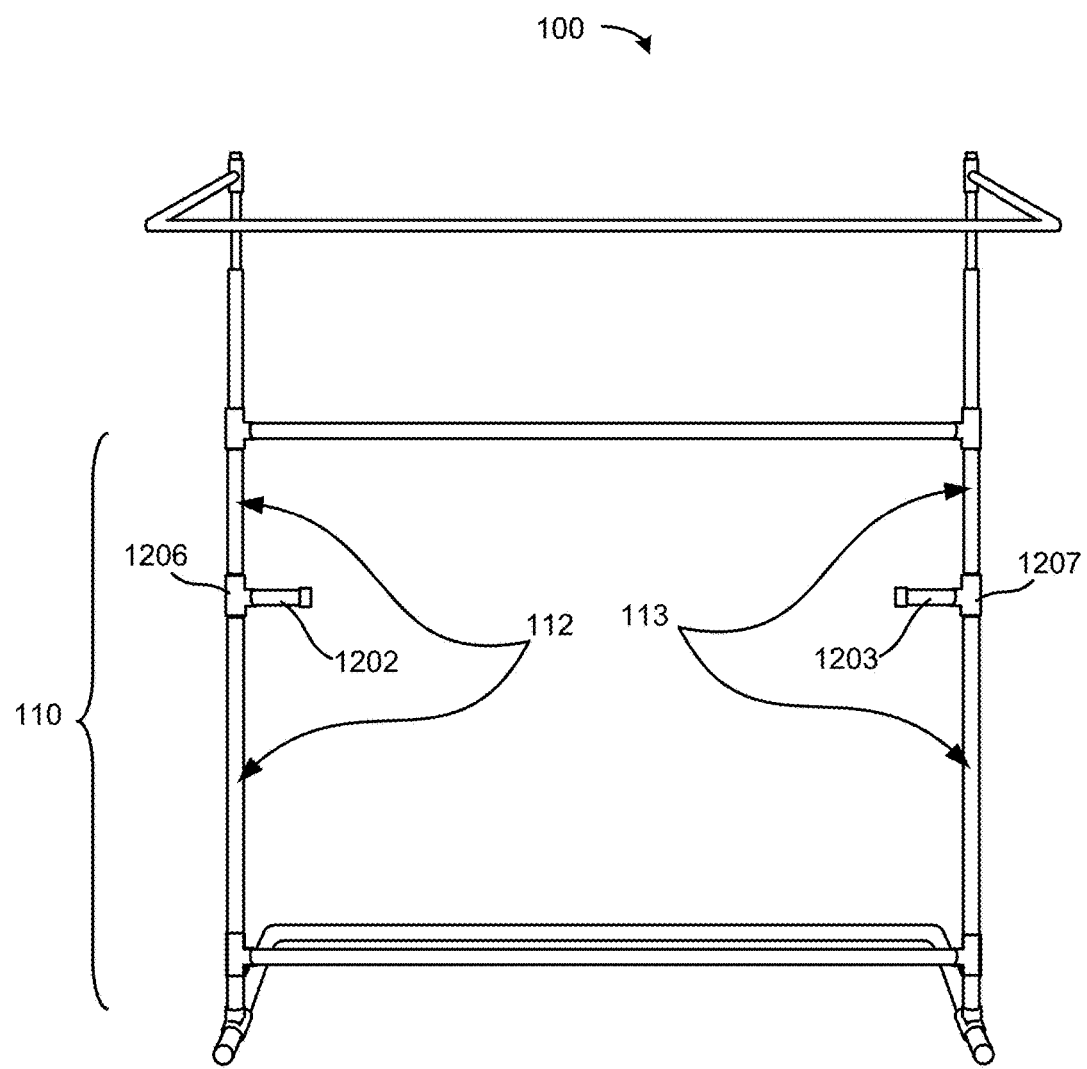
FIG. 12 illustrates a front view of the vinyl wrap hanger and stand with optional guide and holder mounts, in accordance with an embodiment.

FIG. 12 illustrates a front view of the vinyl wrap hanger and stand 100 having optional guide and holder mounts (1202, 1203) attached to the frame assembly 110, in accordance with yet another embodiment. Each guide and holder mounts (1202, 1203) may be added in between each of the vertical posts (112, 113), respectively, using a pair of three-way couplers (1206, 1207), respectively. In practice, the guide and holder mounts (1202, 1203) provides a feed guide to the vinyl sheets as it passes from the support base 101 to the hanger assembly 130. In addition, the guide and holder mounts (1202, 1203) may also act as a tape roller holder or a holder mount for other vinyl tool accessories such as vinyl magnet bars, cutting tools, and measuring tapes.

Figure 13:
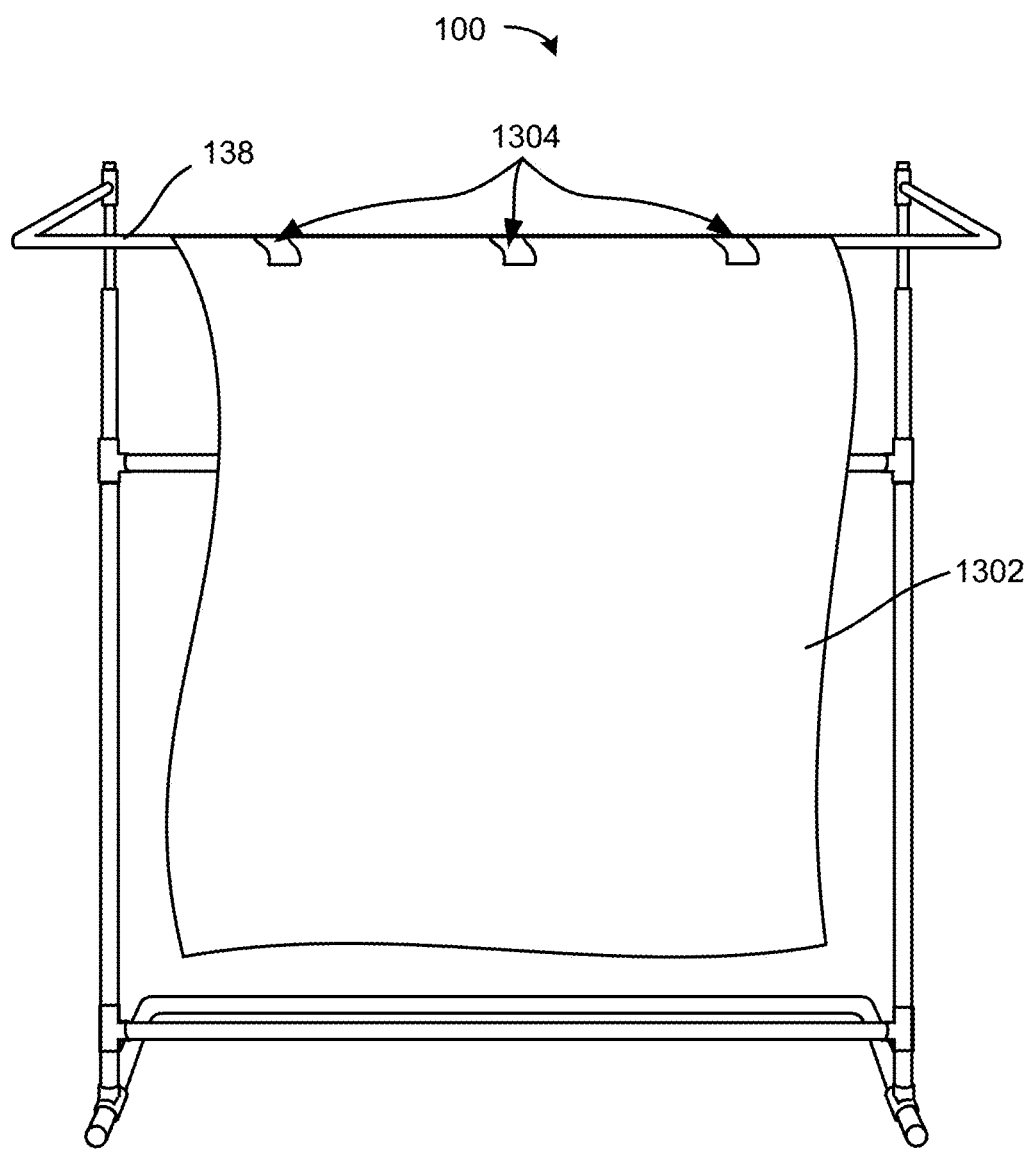
FIG. 13 illustrates a front view of the vinyl wrap hanger and stand with a single sheet of vinyl wrap attached to the hanger bar, in accordance with an embodiment.

In an exemplary implementation, FIG. 13 illustrates a front view of the vinyl wrap hanger and stand 100 with a single sheet of vinyl wrap 1302 hanging on the hanger bar 138. In this example, temporary fasteners are used to hang the vinyl wrap 1302, in that they may be fastened and unfastened repeatedly. For example, tape or adhesive strips 1304 may be used to hang and secure the single sheet of vinyl wrap 1302 to the hanger bar 138 as shown in FIG. 13. In another aspect, c-clips, c-clamps, push-pins, bar clamps, binder clips, binder rings, paper clasps, strip clamps, or other special-purpose closing devices may be used to hang the single sheet of vinyl wrap 1302 to the hanger bar 138. Typical load requirements applied to the hanger bar 138 should less than 5 pounds or approximately the size of a single of vinyl wrap measuring 5 feet×10 feet.

Figure 14:
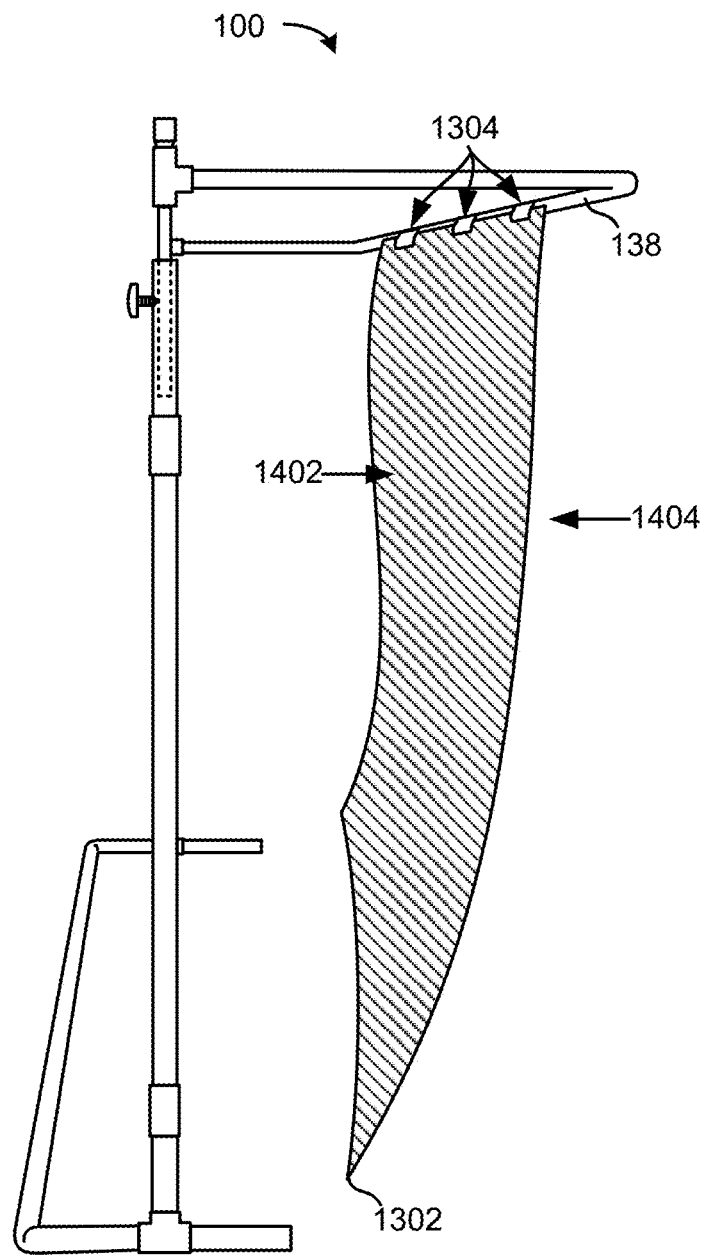
FIG. 14 illustrates a side view of the vinyl wrap hanger and stand with the single sheet of vinyl wrap attached to the hanger bar, in accordance with an embodiment.

FIG. 14 illustrates a side view of the vinyl wrap hanger and stand with the single sheet of vinyl wrap 1302 attached to the hanger bar 138 of the vinyl wrap hanger and stand 100. In application, the single sheet of vinyl wrap 1302 includes a top side 1402 having color, texture, print or graphics (diagonal lines), and an adhesive side 1404 covered by an adhesive liner. In practice, when hanging the vinyl sheet 1302 onto the hanger bar 138, the top side 1402 should be facing the vinyl wrap hanger and stand 100 while the adhesive side 1404 should be facing away from the vinyl wrap hanger and stand 100. Other examples described herein below further illustrate proper usage and application of the vinyl sheet 1302 using the vinyl wrap hanger and stand 100.

Figure 15:
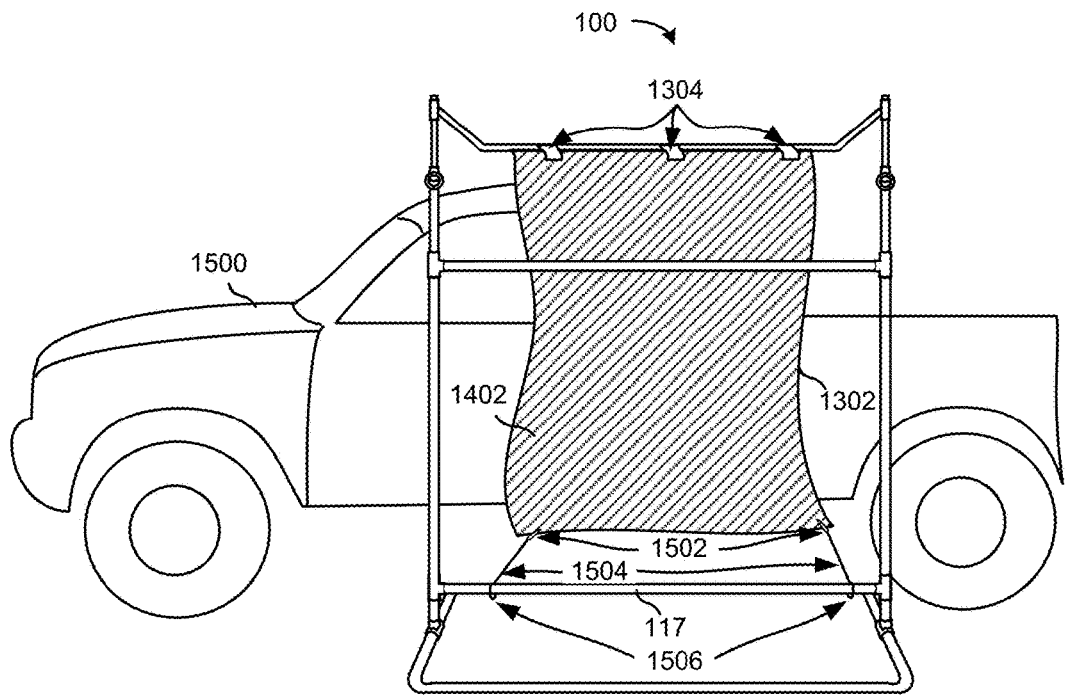
FIG. 15 illustrates a view of back of the vinyl wrap hanger and stand positioned next to the driver side of a vehicle, in accordance with an embodiment.

FIG. 15 illustrates a back view of the vinyl wrap hanger and stand 100 positioned next to the driver side of a vehicle 1500, in yet another implementation. In this illustration, the printed or colored side (diagonal lines) 1402 of the single sheet of vinyl wrap 1302 is visible and generally covers the entire height of the vehicle. Alligator clips 1502 and elastic strings 1504 may be used to hold the bottom of the vinyl wrap 1302 and keep it under tension. In addition, the elastic strings 1504 may be fastened to the bottom horizontal member 117 of the frame assembly 110 using mounting clips or rings 1506.

Figure 16:
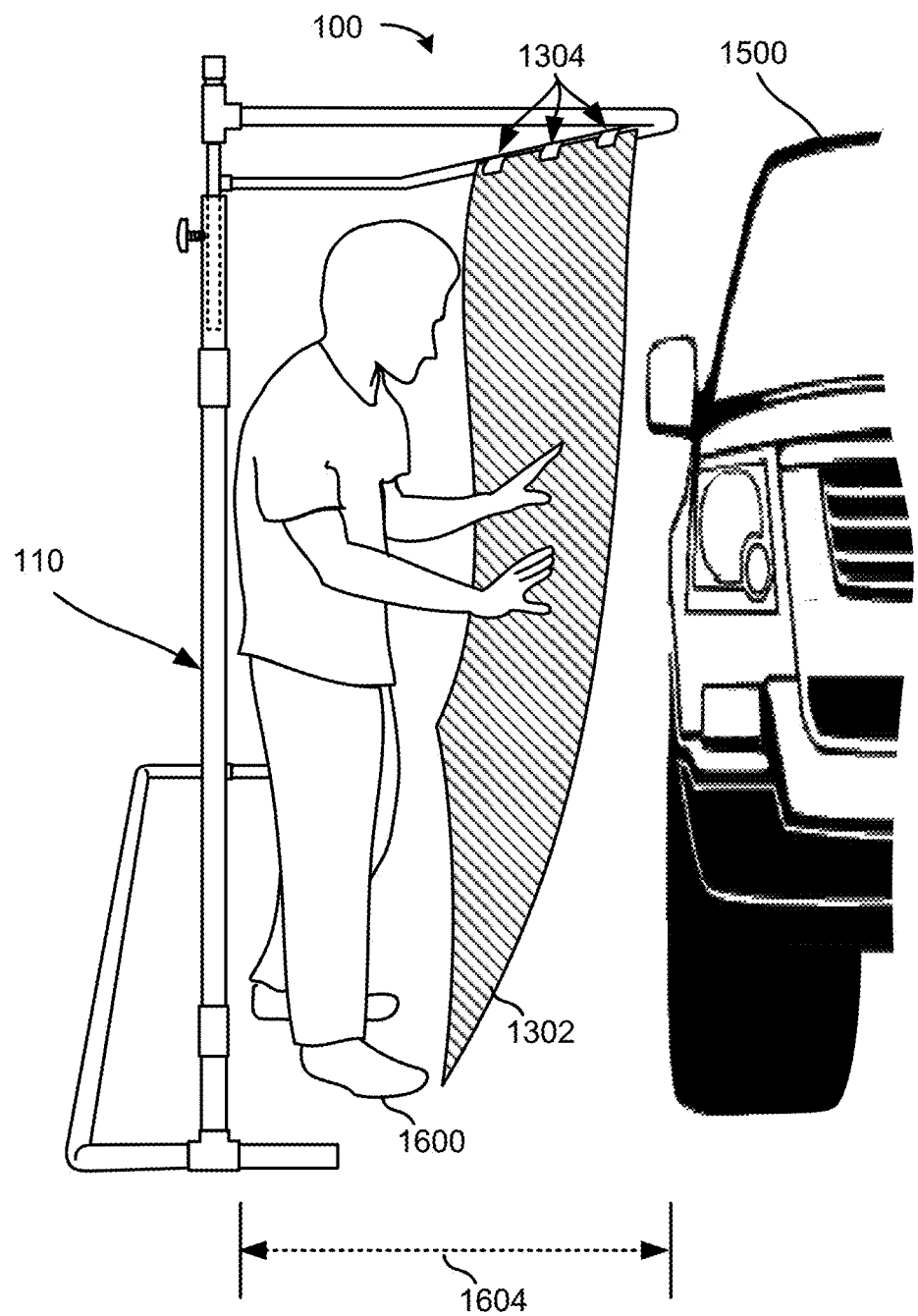
FIG. 16 illustrates a side view of the vinyl wrap hanger and stand and a vinyl wrap installer next to the vehicle, in accordance with an embodiment.

In accordance with yet another implementation of the vinyl wrap hanger and stand 100, FIG. 16 illustrates a side view of the vinyl wrap hanger and stand 100 and a vinyl wrap installer 1600 installing the vinyl wrap 1302 onto a side of the vehicle 1500. The vinyl wrap hanger and stand 100 is generally placed alongside and facing the vehicle 1500 so that the long side of the hanger bar 138 is approximately parallel to the vehicle 1500. Furthermore, the vinyl wrap hanger and stand 100 should be positioned at a working distance 1604 away from the vehicle 1500 so that it provides ample room and working area for the installer 1600 to properly install the hanging vinyl wrap 1302 onto to the side of the vehicle 1500. In practice, the working distance 1604 is defined as the length between the frame assembly 110 and the side of the vehicle 1500. The preferred working distance 1604 while using the vinyl wrap hanger and stand 100 should be greater than 17 inches to avoid poor installation due to limited work space.

Figure 17:
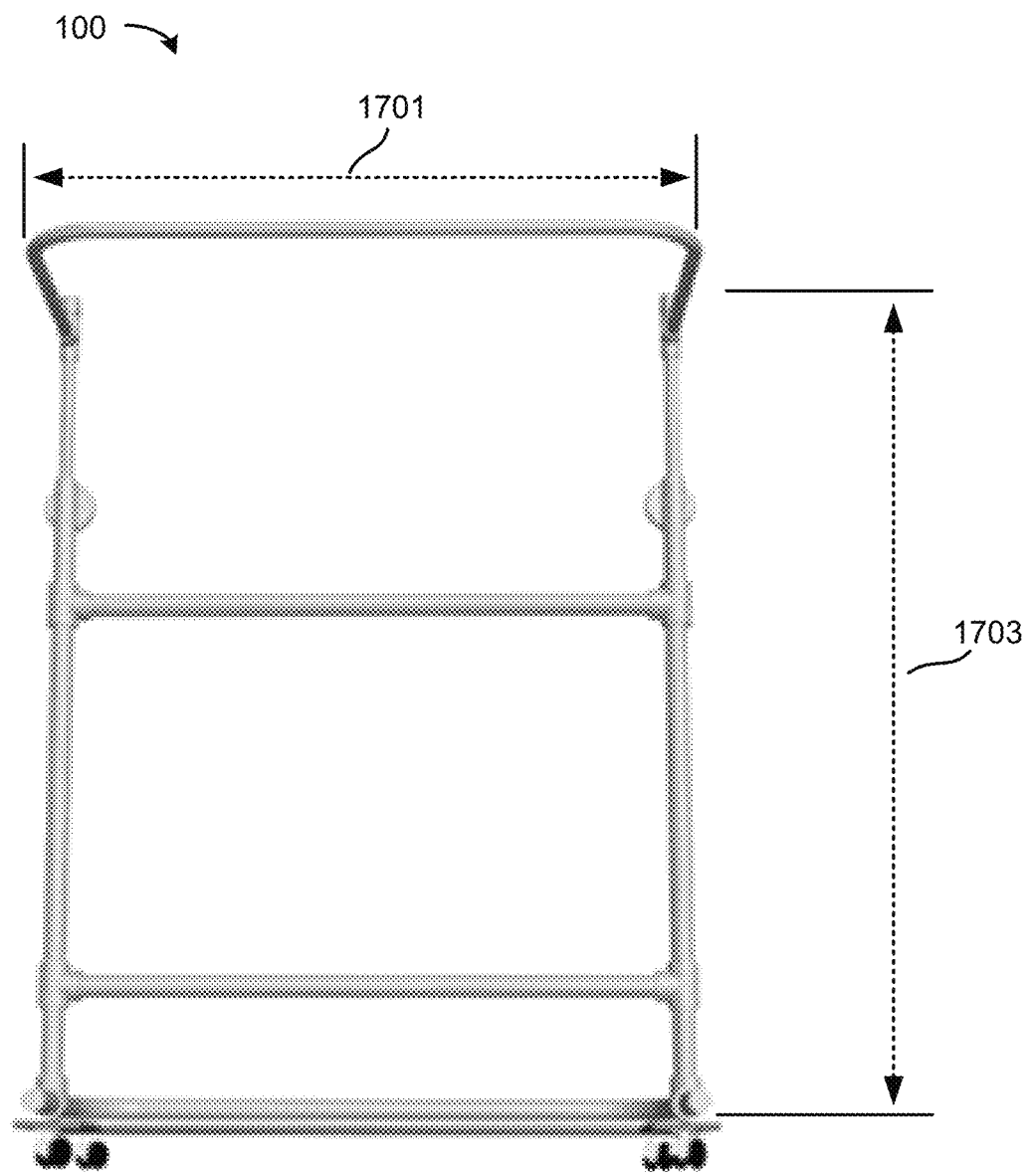
FIG. 17 illustrates a 3D perspective view of the front side of the vinyl wrap hanger and stand, in accordance with an embodiment.

FIG. 17 illustrates a front 3D perspective view of the vinyl wrap hanger and stand 100. Typical dimensions of the vinyl wrap hanger and stand 100 include the following dimensions: a frame assembly having a pre-determined width of at least 60" wide 1701 and a stand height range 1703 of 60"-80" high.

Figure 18:
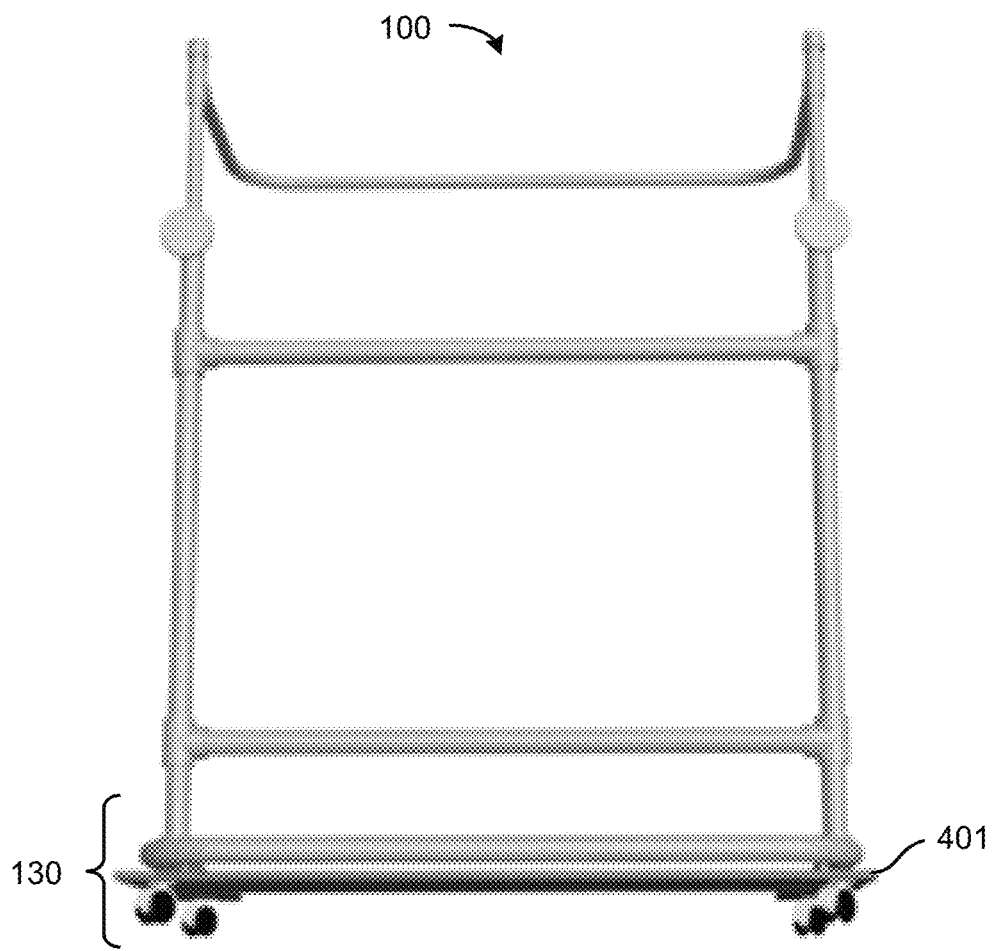
FIG. 18 illustrates a 3D perspective view of the back side the vinyl wrap hanger and stand, in accordance with an embodiment.

FIG. 18 illustrates a 3D perspective view of the back of vinyl wrap hanger and stand. In this example, the platform 401 may have a width and length that generally is the same or slightly greater than that of the support base 130.

Figure 19:
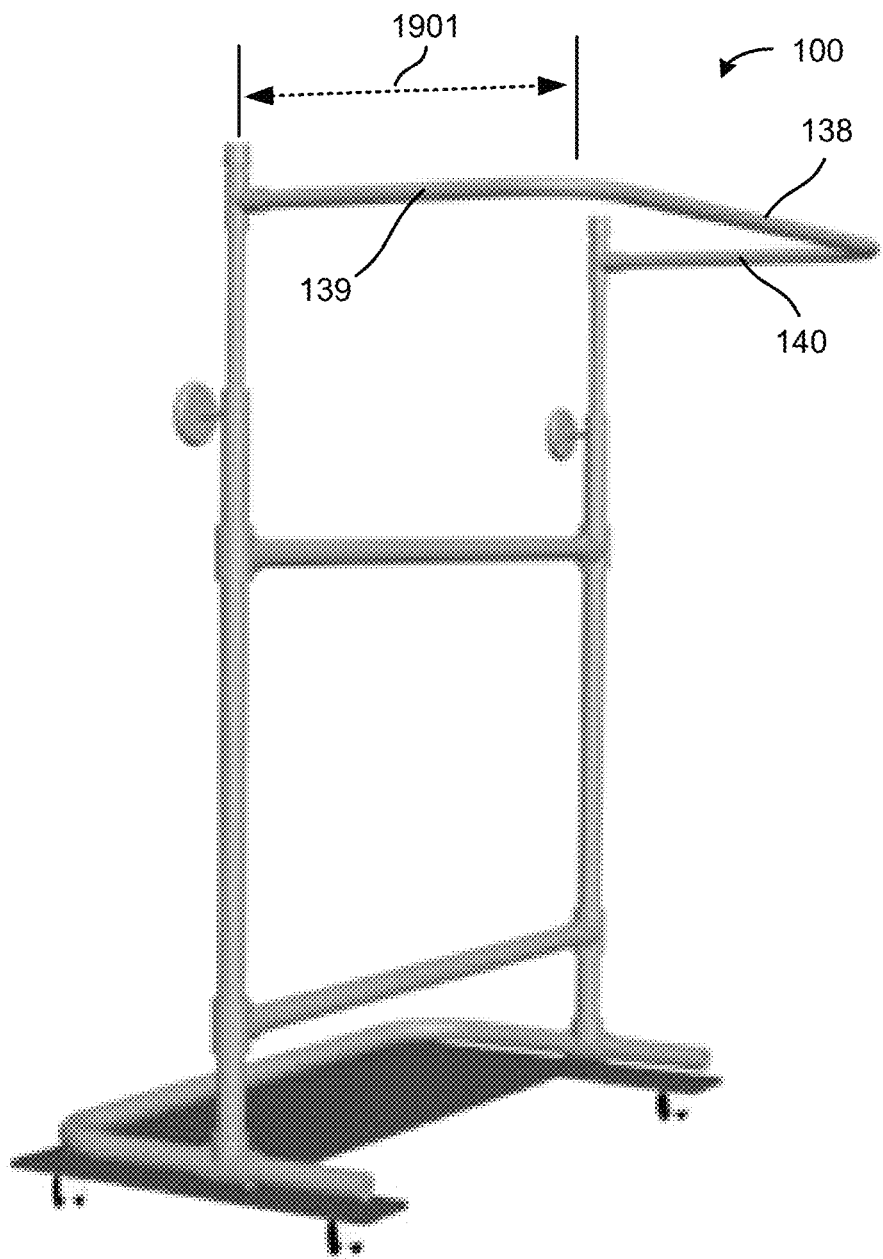
FIG. 19 illustrates a side 3D perspective view of the left side the vinyl wrap hanger and stand, in accordance with an embodiment.

FIG. 19 illustrates a side 3D perspective view of the vinyl wrap hanger and stand 100. In practice, the hanger arm length 1901 of the two hanger arms (139, 140) of the u-shaped hanger bar 138 is made to have a pre-determined length of at least 18". With reference to the adjustable arms 700 as shown in FIG. 7, the adjustable hanger arm length 720 may range from 18" (fully retracted) to 30" (fully extended).

Figure 20:
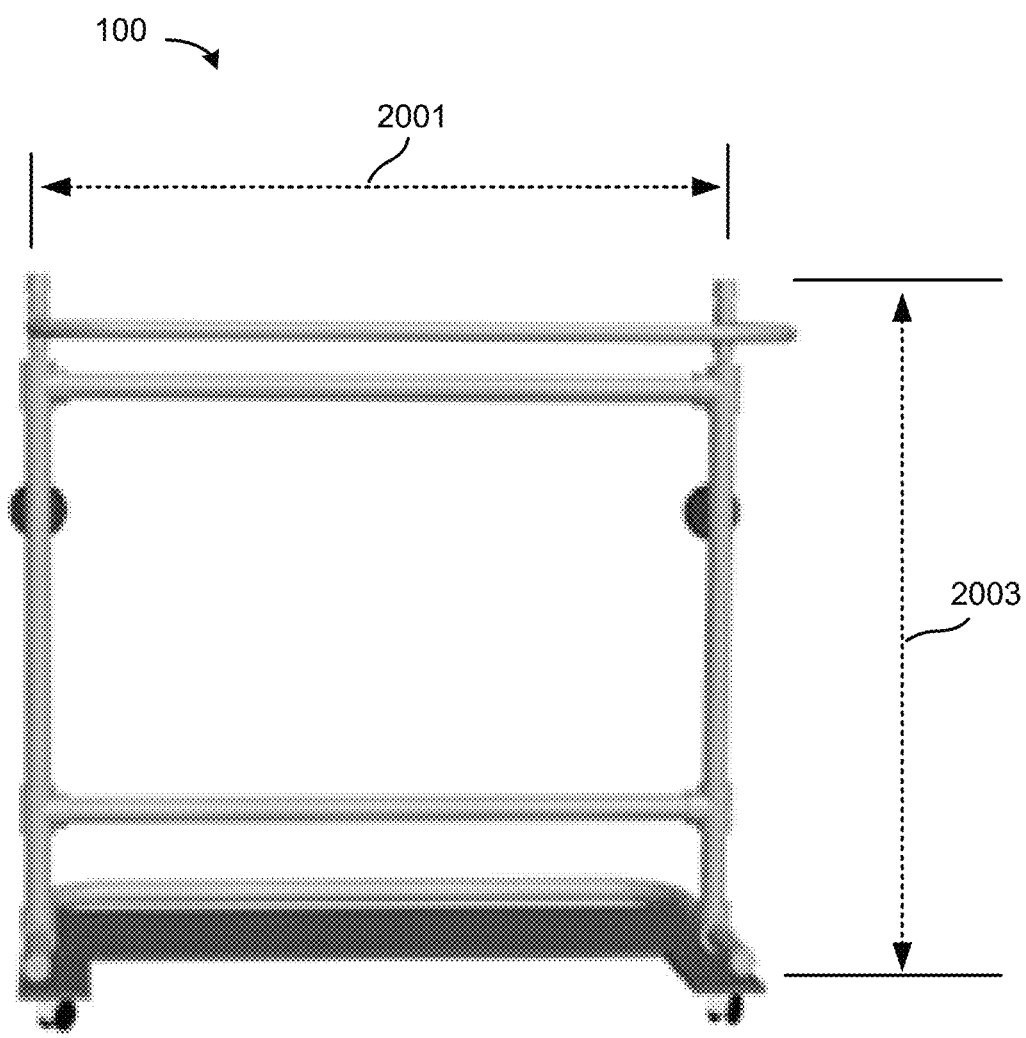
FIG. 20 illustrates a 3D perspective view of an alternate configuration of the front side the vinyl wrap hanger and stand without the height extension pipe, in accordance with an embodiment.

FIG. 20 illustrates a front 3D perspective view of an alternate configuration of the vinyl wrap hanger and stand 100, in accordance with an embodiment. In this example, the height extension pipes (132, 133) may be optionally removed from the adjustable hanger assembly 130 to reduce the overall height of the vinyl wrap hanger and stand 100, accommodating smaller size vehicles. Typical dimensions of the vinyl wrap hanger and stand 100 without the height extension member (132, 133) include the following dimensions: a frame assembly having a pre-determined width of at least 60" wide 2001 and a stand height range 2003 of 40"-60" high.

Figure 21:
FIG. 21 illustrates a 3D perspective view of an alternate configuration of the back side the vinyl wrap hanger and stand without the height extension pipe, in accordance with an embodiment.

FIG. 21 illustrates a back 3D perspective view of an alternate configuration of the vinyl wrap hanger and stand 100 without the height extension member, in accordance with an embodiment.

Figure 22:
FIG. 22 illustrates a 3D perspective view of an alternate configuration of the left side of the vinyl wrap hanger and stand without the height extension pipe, in accordance with an embodiment.

FIG. 22 illustrates a side 3D perspective view of an alternate configuration of the vinyl wrap hanger and stand 100 without the height extension member, in accordance with an embodiment.

Table 1.0 below provides a sample specifications of parts and material used to fabricate the vinyl wrap hanger and stand 100.

TABLE 1.0

| Item | Parts | Fasteners | Composition |
|---|---|---|---|
| base member (102), protruding members (107, 108) vertical posts (112, 113) horizontal members (116, 117) vertical base connectors (126, 127) height extension members (132, 133) adjustable hanger members (134, 135) hanger bar (138) arm extension members (705, 706) | rods, pipes, square tubes, cylinders, bars, molded couplers, posts | welding, glue, screws, bolts, straps | aluminum, steel, composite metals, wood, engineered wood, composite plastics, Polyvinyl chloride (PVC), or combination thereof |
| Couplers (120, 121, 122, 123, 136, 137) | T-connectors, joint connectors, welding joints | welding, glue, screws, bolts | aluminum, steel, composite metals, wood, engineered wood, composite plastics, Polyvinyl chloride (PVC), or combination thereof |
| Platform 401 | hardboards, flexible boards, built-up boards, molded boards | welding, glue, screws, bolts | aluminum, steel, composite metals, composite plastics, wood, engineered wood, or combination thereof |
| locking mechanisms (202, 203, 710, 711, 802, 820) | knurled knobs, knurled clamping knobs, screw clamps, and L Shaped knob screws, spring loaded locking pins, clamps, bolts, quick release fasteners | | aluminum, steel, composite metals, composite plastics, or combination thereof |

Table 2.0 below provides a sample specification of the vinyl rolls compatible with the vinyl wrap hanger and stand 100.

TABLE 2.0

| Item | Width (meters) | Length (meters) | Thickness (mm) | Weight (lbs.) |
|---|---|---|---|---|
| Vinyl Roll 901 | 1.45-1.55 | 10-30 | 0.10-0.20 | 10-100 |

Several advantages may be realized when using the vinyl wrap hanger and stand 100 for applying large sheets of vinyl wrap to the surface of any vehicle or motor crafts. The vinyl wrap hanger and stand 100, for example, allows a single installer to handle and apply large sheets of vinyl, provides ample working space for the installer to conveniently install the vinyl on the side of the vehicle, and has adjustable height and width components to customize the vinyl wrap hanger and stand 100 for use with vehicles of different sizes.

As used in the above specification and the claims provided below, the singular forms "a", "an", and "the" included plural denotations unless the context clearly states otherwise.

It is noted that the foregoing disclosure has been provided merely for the purpose of explanation and is in no way to limit the present invention. Although the examples described hereinabove has been shown and described with respect to several preferred embodiments thereof, various changes, omissions, and additions to the form and detail thereof, may be made therein, without departing from the spirit and scope of the invention. It is understood that the words which have been used herein are words of description and illustration, rather than words of limitation. Changes may be made, within the scope of the appended claims, as presently stated and as amended, without departing from the scope and spirit of the present invention in its aspects.

All patents, patent applications, and other references cited herein are incorporated by reference in their entireties.

Other embodiments and modifications of the embodiments disclosed may occur to those of ordinary skill in the art in view of this disclosure. Accordingly, the invention is to be limited only by the following claims which include all other such embodiments and modifications when viewed in relation with the specifications and drawings.

What is claimed is what is described and illustrated, including:

1. A vinyl wrap hanger and stand for installing a sheet of vinyl wrap on the surface of a vehicle or motor craft, the vinyl wrap hanger and stand comprising:
a support base;
a frame assembly comprising pair of vertical posts, wherein the vertical posts are directly coupled to the support base at generally a perpendicular angle; and an adjustable hanger assembly that includes a pair of adjustable hanger members directly coupled to the respective vertical posts of the frame assembly, a pair of hanger arms wherein each hanger arm is directly coupled to a corresponding adjustable hanger member, and a hanger bar directly coupling the pair of hanger arms, wherein the hanger bar and the pair of hanger arms define a U-shaped rod that extends from the vertical posts at a perpendicular angle; wherein the entire hanger bar extends horizontally across a first vertical plane and the vertical posts are located in a second vertical plane, wherein the first vertical plane is spaced apart from the second vertical plane; wherein the hanger bar is configured to hang the sheet of vinyl wrap;

a platform having a top surface and bottom surface, wherein the top surface is connected to the support base and a vinyl roller assembly is affixed to the top surface of the platform, the vinyl roller assembly having a pair of spaced elongated conveyor rollers configured to support a vinyl roll at an elevated position relative to the platform, and wherein wheels are affixed to the bottom surface of the platform to transport the vinyl wrap hanger and stand.

2. The vinyl wrap hanger and stand of claim 1, wherein the adjustable hanger assembly further comprises a pair of height extension members coupling the frame assembly to the adjustable hanger assembly.

3. The vinyl wrap hanger and stand of claim 2, wherein each height extension member includes a cavity through which a corresponding adjustable hanger member is inserted.

4. The vinyl wrap hanger and stand of claim 3, wherein each adjustable hanger member is fastened to a corresponding height extension member by a fastening mechanism thereby setting the height of the adjustable hanger assembly.

5. The vinyl wrap hanger and stand of claim 4, wherein the fastening mechanism includes knurled knobs, knurled clamping knobs, screw clamps, or L-Shaped screws.

6. The vinyl wrap hanger and stand of claim 1 further comprising a power strip coupled to the top surface of the platform.

7. The vinyl wrap hanger and stand of claim 1, wherein the hanger bar is linear in shape.

8. The vinyl wrap hanger and stand of claim 1, wherein the hanger bar has a curve shape.

9. The vinyl wrap hanger and stand of claim 1, wherein the frame assembly further comprises a pair of horizontal members coupled to the vertical posts by a first set of coupling members and a second set of coupling members, and a pair of vertical base connectors coupled to the vertical posts through the second set of coupling members.

10. The vinyl wrap hanger and stand of claim 9, wherein each vertical post includes a cavity through which a corresponding adjustable hanger member is inserted.

11. The vinyl wrap hanger and stand of claim 9 further comprising a pair of guide and holder mounts, each guide and holder mount coupled to a corresponding vertical post of the frame assembly.

12. The vinyl wrap hanger and stand of claim 1, wherein the vinyl wrap hanger and stand has an adjustable vertical height ranging between 40 to 60 inches.

13. The vinyl wrap hanger and stand of claim 2, wherein the vinyl wrap hanger and stand has an adjustable vertical height ranging between 60 to 80 inches.

14. The vinyl wrap hanger and stand of claim 1, wherein the vinyl wrap hanger and stand has a pre-determined width of at least 60 inches wide.

15. The vinyl wrap hanger and stand of claim 1, wherein each hanger arm has a length of at least 18 inches.

16. The vinyl wrap hanger and stand of claim 1, wherein each hanger arm includes an arm extension member, each arm extension member having a hollow interior, and a pair of arm locking mechanisms coupled to a corresponding arm extension member.

17. The vinyl wrap hanger and stand of claim 1, wherein a top end of the sheet of vinyl wrap is configured to be temporarily fastened to the hanger bar by tape, c-clips, c-clamps, push-pins, bar clamps, binder clips, binder rings, paper clasps, strip clamps or closing devices.

* * * * *